United States Patent
Sridharan et al.

(10) Patent No.: US 11,985,657 B2
(45) Date of Patent: May 14, 2024

(54) INTERLEAVED PUSCH TRANSMISSIONS

(71) Applicant: QUALCOMM Incorporated, San Diego, CA (US)

(72) Inventors: Gokul Sridharan, Sunnyvale, CA (US); Seyedkianoush Hosseini, San Diego, CA (US); Mostafa Khoshnevisan, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 17/492,228

(22) Filed: Oct. 1, 2021

(65) Prior Publication Data

US 2023/0108535 A1    Apr. 6, 2023

(51) Int. Cl.
*H04W 72/12*       (2023.01)
*H04W 8/24*        (2009.01)
*H04W 72/1268*     (2023.01)
*H04W 72/23*       (2023.01)

(52) U.S. Cl.
CPC ......... *H04W 72/1268* (2013.01); *H04W 8/24* (2013.01); *H04W 72/23* (2023.01)

(58) Field of Classification Search
CPC .... H04W 72/1268; H04W 72/23; H04W 8/24
See application file for complete search history.

(56) References Cited

U.S. PATENT DOCUMENTS

| | | | | |
|---|---|---|---|---|
| 2009/0170426 | A1* | 7/2009 | Jung | H04W 8/24 455/7 |
| 2015/0280876 | A1* | 10/2015 | You | H04L 27/2613 370/329 |
| 2017/0223695 | A1* | 8/2017 | Kwak | H04L 5/0051 |
| 2018/0139770 | A1* | 5/2018 | Ozturk | H04L 5/0078 |

(Continued)

FOREIGN PATENT DOCUMENTS

WO    WO-2020226356 A1    11/2020

OTHER PUBLICATIONS

International Search Report and Written Opinion—PCT/US2022/042539—ISA/EPO—dated Feb. 3, 2023.

(Continued)

*Primary Examiner* — Brenda H Pham
(74) *Attorney, Agent, or Firm* — Holland & Hart LLP

(57) ABSTRACT

Methods, systems, and devices for wireless communications are described. A user equipment (UE) may report, to a base station, a capability of the UE to support interleaving physical uplink shared channel (PUSCH) messages. The base station may schedule two or more PUSCH transmissions having temporally overlapping durations based on the reported capability of the UE, and the UE may transmit interleaved PUSCH messages scheduled by the base station. In some cases, demodulation reference signal (DMRS) bundling may be enabled for PUSCH transmissions. A UE may be incapable of both performing DMRS bundling for PUSCH transmissions and transmitting interleaved PUSCH transmissions. In some case, a UE may disable DMRS (Continued)

bundling, drop a scheduled PUSCH transmission, transmit PUSCH messages sequentially (e.g., not interleaved), and/or indicate an error to the base station if the UE receives uplink grants scheduling two or more PUSCH transmissions having temporally overlapping durations.

20 Claims, 26 Drawing Sheets

(56) References Cited

U.S. PATENT DOCUMENTS

| | | | |
|---|---|---|---|
| 2019/0045556 A1* | 2/2019 | Bagheri | H04W 72/23 |
| 2020/0213955 A1* | 7/2020 | Hosseini | H04W 72/0473 |
| 2020/0281009 A1* | 9/2020 | Lee | H04L 27/2607 |
| 2021/0377923 A1* | 12/2021 | Ge | H04W 72/1263 |
| 2022/0210802 A1 | 6/2022 | Hwang et al. | |
| 2023/0164819 A1* | 5/2023 | Yuan | H04W 8/24 370/336 |

OTHER PUBLICATIONS

Moderator : Nokia et al: "Final Fl Summary of Tb Processing over Multi-slot PUSCH (AI 8.8.1.2)", WG1 #106-e, R1-2108545, 3rd Generation Partnership Project (3GPP), Mobile Competence Centre, 650, Route Des Lucioles, F-06921 Sophia-Antipolis Cedex, France, vol. RAN WG1, No. e-Meeting; Aug. 16, 2021-Aug. 27, 2021, Aug. 16-27, 2021, 153 pages, XP052042814, R1-2108545 Final FL summary of TB processing over multi-slot PUSCH (AI 8.8.1.2) .The whole document.

Partial International Search Report—PCT/US2022/042539—ISA/EPO—dated Dec. 13, 2022.

TCL Communication: "Discussion on TBoMS", R1-2107198, #106-e, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16-27, 2021, Aug. 16, 2021-Aug. 27, 2021, Aug. 6, 2021, 4 Pages, XP052033482, The whole document.

* cited by examiner

INTERLEAVED PUSCH TRANSMISSIONS

FIELD OF TECHNOLOGY

The following relates to wireless communications, including interleaved physical uplink shared channel (PUSCH) transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support interleaved physical uplink shared channel (PUSCH) transmissions. Generally, the described techniques provide for configuring a user equipment (UE) to report, to a base station, a capability of the UE to support interleaving two or more PUSCH messages. A capability of a UE to support interleaving PUSCH messages or may be determined by a hardware or software capability of the UE, for example a size of a buffer of the UE that is allocated for buffering PUSCH messages. The base station may schedule PUSCH transmissions having temporally overlapping durations based on the reported capability of the UE, and the UE may transmit interleaved PUSCH messages scheduled by the base station. In some cases, demodulation reference signal (DMRS) bundling may be enabled for PUSCH transmissions. A UE may be incapable of both performing DMRS bundling for PUSCH transmissions and transmitting interleaved PUSCH transmissions. In some examples, a UE may disable DMRS bundling if the UE receives uplink grants scheduling two or more PUSCH transmissions having temporally overlapping durations. In some examples, a UE may drop a scheduled PUSCH transmission if the UE receives uplink grants scheduling two or more PUSCH transmissions having temporally overlapping durations while DMRS bundling is enabled. In some examples, a UE may transmit PUSCH messages sequentially (e.g., not interleaved) if the UE receives uplink grants scheduling two or more PUSCH transmissions having temporally overlapping durations while DMRS bundling is enabled. In some examples, a UE may indicate an error to the base station if the UE receives uplink grants scheduling two or more PUSCH transmissions having temporally overlapping durations while DMRS bundling is enabled.

A method for wireless communications at a user equipment (UE) is described. The method may include transmitting, to a base station, a message indicating a capability of the UE to support interleaving two or more uplink shared channel messages, receiving, from the base station, a first control message that schedules a first uplink shared channel message, receiving, from the base station and based on the capability of the UE, a second control message that schedules a second uplink shared channel message, where a duration associated with the second uplink shared channel message at least partially overlaps with a duration associated with the first uplink shared channel message, and transmitting the first and second uplink shared channel messages to the base station, the first and second uplink shared channel messages interleaved based on the capability of the UE.

An apparatus for wireless communications at a UE is described. The apparatus may include a processor, memory coupled with the processor, and instructions stored in the memory. The instructions may be executable by the processor to cause the apparatus to transmit, to a base station, a message indicating a capability of the UE to support interleaving two or more uplink shared channel messages, receive, from the base station, a first control message that schedules a first uplink shared channel message, receive, from the base station and based on the capability of the UE, a second control message that schedules a second uplink shared channel message, where a duration associated with the second uplink shared channel message at least partially overlaps with a duration associated with the first uplink shared channel message, and transmit the first and second uplink shared channel messages to the base station, the first and second uplink shared channel messages interleaved based on the capability of the UE.

Another apparatus for wireless communications at a UE is described. The apparatus may include means for transmitting, to a base station, a message indicating a capability of the UE to support interleaving two or more uplink shared channel messages, means for receiving, from the base station, a first control message that schedules a first uplink shared channel message, means for receiving, from the base station and based on the capability of the UE, a second control message that schedules a second uplink shared channel message, where a duration associated with the second uplink shared channel message at least partially overlaps with a duration associated with the first uplink shared channel message, and means for transmitting the first and second uplink shared channel messages to the base station, the first and second uplink shared channel messages interleaved based on the capability of the UE.

A non-transitory computer-readable medium storing code for wireless communications at a UE is described. The code may include instructions executable by a processor to transmit, to a base station, a message indicating a capability of the UE to support interleaving two or more uplink shared channel messages, receive, from the base station, a first control message that schedules a first uplink shared channel message, receive, from the base station and based on the capability of the UE, a second control message that schedules a second uplink shared channel message, where a duration associated with the second uplink shared channel message at least partially overlaps with a duration associated with the first uplink shared channel message, and transmit the first and second uplink shared channel messages to the base station, the first and second uplink shared channel messages interleaved based on the capability of the UE.

Some examples of the method, apparatuses, and non-transitory computer-readable medium described herein may further include operations, features, means, or instructions for transmitting, to the base station, a second message indicating a total number of interleaved uplink shared channel messages the UE may be capable of supporting per component carrier associated with the UE.

Some examples of the method, apparatuses, and non-transitory computer-readable medium described herein may further include operations, features, means, or instructions for transmitting, to the base station, a second message indicating a total number of interleaved uplink shared channel messages the UE may be supporting of interleaving across all component carriers associated with the UE.

Some examples of the method, apparatuses, and non-transitory computer-readable medium described herein may further include operations, features, means, or instructions for receiving, from the base station, a request for an indication of the capability of the UE to support transmitting two or more uplink shared channel messages that may be interleaved in time.

Some examples of the method, apparatuses, and non-transitory computer-readable medium described herein may further include operations, features, means, or instructions for receiving the first control message includes receiving a first dynamic grant, the first dynamic grant scheduling the first uplink shared channel message and receiving the second control message includes receiving a second dynamic grant, the second dynamic grant scheduling the second uplink shared channel message.

Some examples of the method, apparatuses, and non-transitory computer-readable medium described herein may further include operations, features, means, or instructions for receiving the first control message includes receiving a first configured grant, the first configured grant scheduling the first uplink shared channel message and receiving the second control message includes receiving a second configured grant, the second configured grant scheduling the second uplink shared channel message.

Some examples of the method, apparatuses, and non-transitory computer-readable medium described herein may further include operations, features, means, or instructions for receiving the first control message includes receiving a configured grant, the configured grant scheduling the first uplink shared channel message and receiving the second control message includes receiving a dynamic grant, the dynamic grant scheduling the second uplink shared channel message.

Some examples of the method, apparatuses, and non-transitory computer-readable medium described herein may further include operations, features, means, or instructions for determining, based on a buffer size of the UE, that the UE may have the capability to support transmitting two or more uplink shared channel messages that may be interleaved, where the message indicating the capability of the UE to support transmitting two or more uplink shared channel messages that may be interleaved may be transmitted based on the determining.

Some examples of the method, apparatuses, and non-transitory computer-readable medium described herein may further include operations, features, means, or instructions for buffering a first encoded payload associated with the first uplink shared channel message and buffering a second encoded payload associated with the second uplink shared channel message.

Some examples of the method, apparatuses, and non-transitory computer-readable medium described herein may further include operations, features, means, or instructions for encoding a first payload associated with the first uplink shared channel message before transmission of the first uplink shared channel message and encoding a second payload associated with the second uplink shared channel message before transmission of the second uplink shared channel message.

In some examples of the method, apparatuses, and non-transitory computer-readable medium described herein, the first uplink shared channel message may be a type-1 uplink shared channel message and the second uplink shared channel message may be a type-2 uplink shared channel message.

A method for wireless communications at a base station is described. The method may include receiving, from a UE, a message indicating a capability of the UE to support interleaving two or more uplink shared channel messages, transmitting, to the UE, a first control message that schedules a first uplink shared channel message based on the capability of the UE, transmitting, to the UE, a second control message that schedules a second uplink shared channel message based on the capability of the UE, where a duration associated with the second uplink shared channel message at least partially overlaps a duration associated with the first uplink shared channel message in time, and receiving, from the UE, the first and second uplink shared channel messages interleaved based on the capability of the UE.

An apparatus for wireless communications at a base station is described. The apparatus may include a processor, memory coupled with the processor, and instructions stored in the memory. The instructions may be executable by the processor to cause the apparatus to receive, from a UE, a message indicating a capability of the UE to support interleaving two or more uplink shared channel messages, transmit, to the UE, a first control message that schedules a first uplink shared channel message based on the capability of the UE, transmit, to the UE, a second control message that schedules a second uplink shared channel message based on the capability of the UE, where a duration associated with the second uplink shared channel message at least partially overlaps a duration associated with the first uplink shared channel message in time, and receive, from the UE, the first and second uplink shared channel messages interleaved based on the capability of the UE.

Another apparatus for wireless communications at a base station is described. The apparatus may include means for receiving, from a UE, a message indicating a capability of the UE to support interleaving two or more uplink shared channel messages, means for transmitting, to the UE, a first control message that schedules a first uplink shared channel message based on the capability of the UE, means for transmitting, to the UE, a second control message that schedules a second uplink shared channel message based on the capability of the UE, where a duration associated with the second uplink shared channel message at least partially overlaps a duration associated with the first uplink shared channel message in time, and means for receiving, from the UE, the first and second uplink shared channel messages interleaved based on the capability of the UE.

A non-transitory computer-readable medium storing code for wireless communications at a base station is described. The code may include instructions executable by a processor to receive, from a UE, a message indicating a capability of the UE to support interleaving two or more uplink shared channel messages, transmit, to the UE, a first control message that schedules a first uplink shared channel message based on the capability of the UE, transmit, to the UE, a second control message that schedules a second uplink shared channel message based on the capability of the UE, where a duration associated with the second uplink shared channel message at least partially overlaps a duration associated with the first uplink shared channel message in time, and receive, from the UE, the first and second uplink shared channel messages interleaved based on the capability of the UE.

Some examples of the method, apparatuses, and non-transitory computer-readable medium described herein may further include operations, features, means, or instructions for receiving, from the UE, a second message indicating a total number of interleaved uplink shared channel messages the UE may be capable of supporting per component carrier associated with the UE.

Some examples of the method, apparatuses, and non-transitory computer-readable medium described herein may further include operations, features, means, or instructions for receiving, from the UE, a second message indicating a total number of interleaved uplink shared channel messages the UE may be capable of supporting across all component carriers associated with the UE.

Some examples of the method, apparatuses, and non-transitory computer-readable medium described herein may further include operations, features, means, or instructions for transmitting, to the UE, a request for an indication of the capability of the UE to support transmitting two or more uplink shared channel messages that may be interleaved in time.

Some examples of the method, apparatuses, and non-transitory computer-readable medium described herein may further include operations, features, means, or instructions for transmitting the first control message includes transmitting a first dynamic grant, the first dynamic grant scheduling the first uplink shared channel message and transmitting the second control message includes transmitting a second dynamic grant, the second dynamic grant scheduling the second uplink shared channel message.

Some examples of the method, apparatuses, and non-transitory computer-readable medium described herein may further include operations, features, means, or instructions for transmitting the first control message includes transmitting a first configured grant, the first configured grant scheduling the first uplink shared channel message and transmitting the second control message includes transmitting a second configured grant, the second configured grant scheduling the second uplink shared channel message.

Some examples of the method, apparatuses, and non-transitory computer-readable medium described herein may further include operations, features, means, or instructions for transmitting the first control message includes transmitting a configured grant, the configured grant scheduling the first uplink shared channel message and transmitting the second control message includes transmitting a dynamic grant, the dynamic grant scheduling the second uplink shared channel message.

In some examples of the method, apparatuses, and non-transitory computer-readable medium described herein, the first uplink shared channel message may be a type-1 uplink shared channel message and the second uplink shared channel message may be a type-2 uplink shared channel message.

A method for wireless communications at a UE is described. The method may include receiving, from a base station, a first control message that schedules a first uplink shared channel message, receiving, from the base station, a second control message that schedules a second uplink shared channel message for interleaving with the first uplink shared channel message, receiving an indication that demodulation reference signal bundling is enabled for at least one of the first uplink shared channel message or the second uplink shared channel message, and performing a cancellation operation based on the indication that reference signal bundling is enabled.

An apparatus for wireless communications at a UE is described. The apparatus may include a processor, memory coupled with the processor, and instructions stored in the memory. The instructions may be executable by the processor to cause the apparatus to receive, from a base station, a first control message that schedules a first uplink shared channel message, receive, from the base station, a second control message that schedules a second uplink shared channel message for interleaving with the first uplink shared channel message, receive an indication that demodulation reference signal bundling is enabled for at least one of the first uplink shared channel message or the second uplink shared channel message, and perform a cancellation operation based on the indication that reference signal bundling is enabled.

Another apparatus for wireless communications at a UE is described. The apparatus may include means for receiving, from a base station, a first control message that schedules a first uplink shared channel message, means for receiving, from the base station, a second control message that schedules a second uplink shared channel message for interleaving with the first uplink shared channel message, means for receiving an indication that demodulation reference signal bundling is enabled for at least one of the first uplink shared channel message or the second uplink shared channel message, and means for performing a cancellation operation based on the indication that reference signal bundling is enabled.

A non-transitory computer-readable medium storing code for wireless communications at a UE is described. The code may include instructions executable by a processor to receive, from a base station, a first control message that schedules a first uplink shared channel message, receive, from the base station, a second control message that schedules a second uplink shared channel message for interleaving with the first uplink shared channel message, receive an indication that demodulation reference signal bundling is enabled for at least one of the first uplink shared channel message or the second uplink shared channel message, and perform a cancellation operation based on the indication that reference signal bundling is enabled.

In some examples of the method, apparatuses, and non-transitory computer-readable medium described herein, performing the cancellation operation may include operations, features, means, or instructions for transmitting, to the base station, the first uplink shared channel message using demodulation reference signal bundling and dropping the second uplink shared channel message.

In some examples of the method, apparatuses, and non-transitory computer-readable medium described herein, performing the cancellation operation may include operations, features, means, or instructions for transmitting, to the base station, the second uplink shared channel message using demodulation reference signal bundling and dropping the first uplink shared channel message.

In some examples of the method, apparatuses, and non-transitory computer-readable medium described herein, performing the cancellation operation may include operations, features, means, or instructions for transmitting, to the base station, the first uplink shared channel message using demodulation reference signal bundling and transmitting, to the base station, the second uplink shared channel message using demodulation reference signal bundling after transmission of all of one or more repetitions of the first uplink shared channel message.

In some examples of the method, apparatuses, and non-transitory computer-readable medium described herein, performing the cancellation operation may include operations, features, means, or instructions for disabling demodulation reference signal bundling for the indicated at least one of the first uplink shared channel message or the second uplink shared channel message and transmitting the first and second uplink shared channel messages to the base station, the first and second uplink shared channel messages interleaved.

In some examples of the method, apparatuses, and non-transitory computer-readable medium described herein, performing the cancellation operation may include operations, features, means, or instructions for transmitting, to the base station, a message than indicates that the UE may be incapable of both interleaving the first and second uplink shared channel messages and enabling demodulation reference signal bundling.

DETAILED DESCRIPTION

Figure 1:
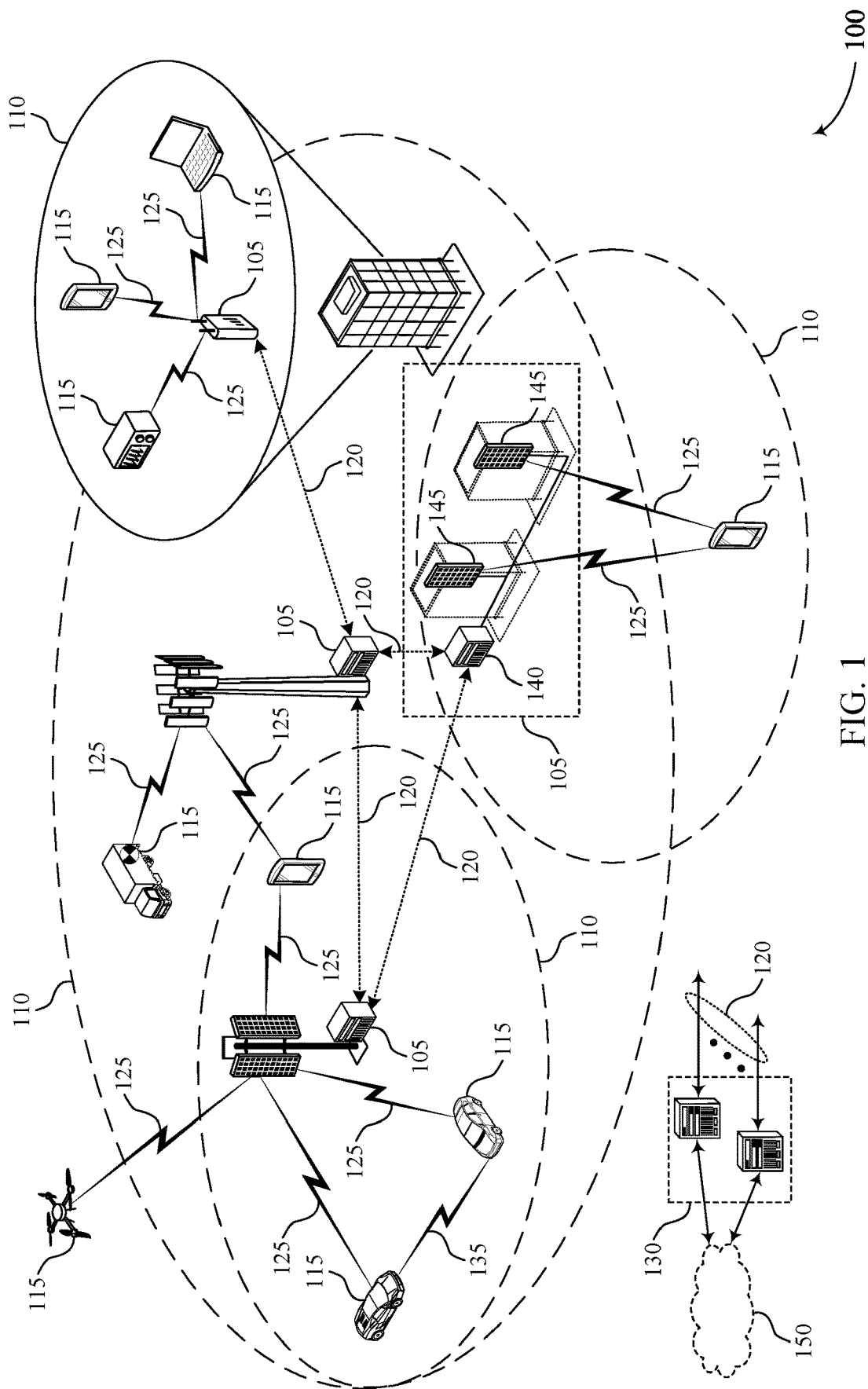
FIG. 1 illustrates an example of a wireless communications system that supports interleaved physical uplink shared channel (PUSCH) transmissions in accordance with aspects of the present disclosure.

In some wireless communications systems, the network may schedule wireless devices, such as user equipments (UEs), to transmit messages within sets of pre-configured uplink occasions. For example, a configured grant (CG) may schedule a UE to transmit physical uplink shared channel (PUSCH) messages within a set of pre-configured transmission occasions scheduled via the CG. Additionally or alternatively, some wireless communications systems may enable the network to dynamically schedule UEs to transmit messages via dynamic grants (DGs) that may be scheduled in downlink control information (DCI). Some UEs may not be configured to or capable of transmitting some types of PUSCH messages concurrently. For example, some UEs may not expect to receive a DG for a PUSCH message or a transport block over multiple slots (TBoMS) that is to be interleaved with a previously scheduled PUSCH message. In other words, in some UEs, a second PUSCH message scheduled by a later in time DG may not be scheduled until the transmission of a first PUSCH message scheduled by an earlier dynamic grant has been completed (e.g., all repetitions have been transmitted or a complete TBoMS is transmitted). A capability of a UE to transmit interleaved PUSCH messages may be determined by a hardware or software capability of the UE, for example a size of a buffer of the UE that is allocated for buffering PUSCH messages.

Some wireless communications systems may bundle demodulation reference signals (DMRSs) in order to improve channel estimation and improve a reliability of wireless communications. For example, UEs may transmit DMRSs having phase continuity across multiple slots in conjunction with bundled uplink transmissions (e.g., PUSCH repetitions or physical uplink control channel (PUCCH) repetitions) to enable the base station to aggregate the DMRSs, perform more accurate channel estimation, and demodulate the uplink channel transmissions. In some cases, DMRSs having phase-continuity across multiple slots and/or multiple transmissions may be said to be "bundled" across the multiple slots and/or multiple transmissions. A base station may configure a UE to perform DMRS. Some UEs may be unable to support DMRS bundling across multiple interleaved PUSCH messages.

In some examples, a UE may indicate to the network (e.g., a base station the UE is communicating with), whether the UE is capable of supporting interleaved uplink shared channel transmissions (e.g., PUSCH transmissions) based on dynamic or configured grants and regardless of whether an earlier uplink shared channel transmission has been completed. For example, a UE may be capable of supporting interleaved PUSCH transmissions if the UE has sufficient memory, for example to buffer multiple PUSCH transmissions. A UE may interleave type-1 and/or type-2 (e.g., TBoMS) PUSCH messages. A UE may indicate to the base station a maximum number of interleaved PUSCH transmissions the UE may support at any time per component carrier. The UE may alternatively or additionally indicate a maximum number of interleaved PUSCH transmissions the UE may support at any time across all component carriers. The base station may schedule two or more PUSCH messages having an overlapping duration. The UE may interleave scheduled PUSCH messages that are overlapping in time.

In some cases, a UE may receive grants scheduling two or more PUSCH messages having an overlapping duration while DMRS bundling is enabled for PUSCH transmissions. If a UE receives grants scheduling the UE to transmit interleaved PUSCH messages while DMRS bundling is enabled for PUSCH transmissions, then the UE may disable DMRS bundling, terminate or drop at least one of the scheduled PUSCH messages, terminate interleaving of the PUSCH messages (e.g., transmit the scheduled PUSCH messages sequentially), and/or indicate an error to the base station.

Aspects of the disclosure are initially described in the context of wireless communications systems. Aspects of the disclosure are further illustrated by and described with reference to timelines, wireless communications systems, and process flows. Aspects of the disclosure are further illustrated by and described with reference to apparatus diagrams, system diagrams, and flowcharts that relate to interleaved PUSCH transmissions.

FIG. 1 illustrates an example of a wireless communications system 100 that supports interleaved PUSCH transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may indicate to a base station 105 whether the UE 115 is capable of interleaving PUSCH transmissions based on dynamic or configured uplink grants. For example, based on hardware or software capabilities (e.g., based on the buffer size allocated for PUSCH messages or the UE 115 memory size), the UE 115 may be capable of interleaving multiple PUSCH transmissions if the UE 115 has sufficient memory (e.g., a sufficient buffer for PUSCH transmissions), to buffer multiple PUSCH transmissions. A UE may interleave type-1 and/or type-2 (e.g., TBoMS) PUSCH messages. In some cases, the UE 115 may indicate, to the base station 105, a maximum number of interleaved PUSCH transmissions that the UE 115 may support at any time per component carrier. In some cases, the UE 115 may alternatively or additionally indicate a maximum number of interleaved PUSCH transmissions that the UE 115 may support at any time across all component carriers. The base station 105 may schedule, via uplink grants, PUSCH messages overlapping in time based on the indication of whether the UE 115 is capable of interleaving PUSCH messages. The UE 115 may transmit, to the base station 105, interleaved PUSCH messages that were scheduled by the base station 105.

In some cases, the base station 105 may send a message to the UE 115 enabling DMRS bundling for PUSCH transmissions. In some cases, a UE 115 may receive grants from the base station 105 scheduling PUSCH messages that are overlapping in time while DMRS bundling is enabled for PUSCH transmissions. If a UE 115 receives grants from a base station 105 scheduling PUSCH messages while DMRS bundling is enabled for PUSCH transmissions, then the UE 115 may disable DMRS bundling, terminate or drop at least one of the scheduled PUSCH messages, terminate interleaving of the PUSCH messages (e.g., transmit the scheduled PUSCH messages sequentially), and/or indicate an error to the base station.

Figure 2:
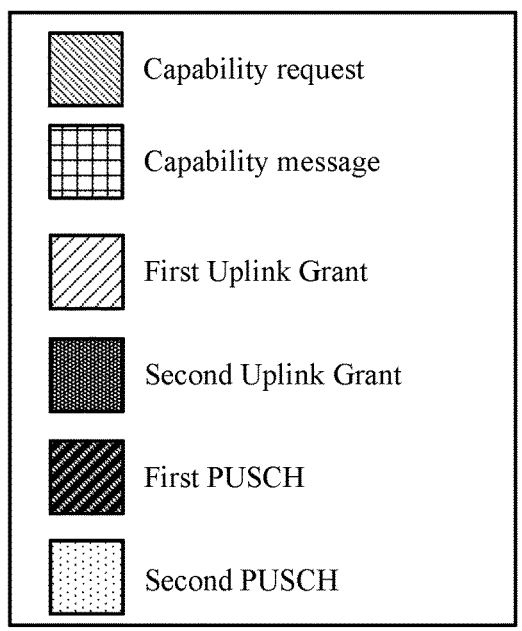
FIG. 2 illustrates an example of a wireless communications system that supports interleaved PUSCH transmissions in accordance with aspects of the present disclosure.
Figure 2:
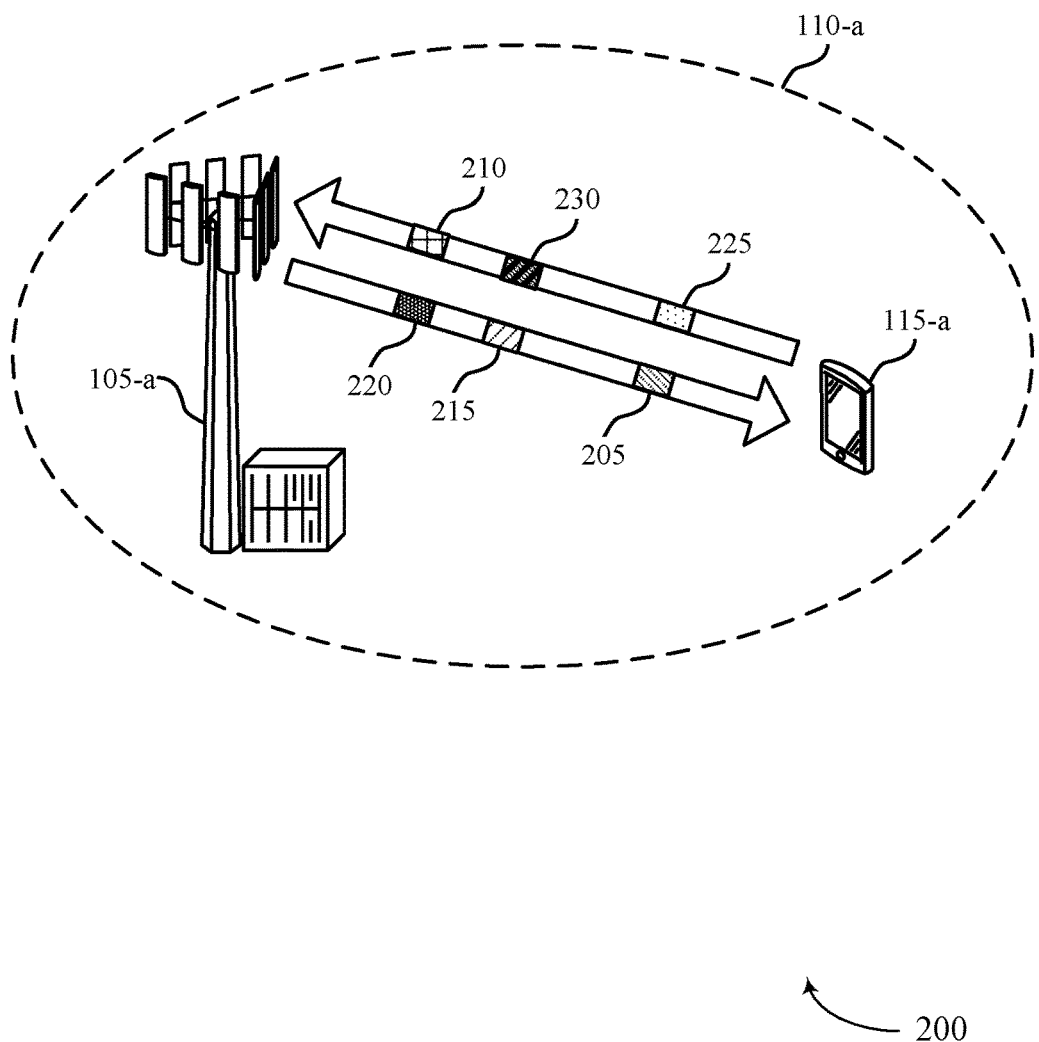

FIG. 2 illustrates an example of a wireless communications system 200 that supports interleaved PUSCH transmissions in accordance with aspects of the present disclosure. In some examples, wireless communications system 200 may implement or may be implemented by aspects of wireless communications system 100. For example, the wireless communications system 200 may include a base station 105-a, which may be an example of a base station 105 as described herein, and UE 115-a which may be an example of UEs 115 as described herein. The base station 105-a and the UE 115-a may communicate within a geographic coverage area 110-a of the base station 105-a, which may be an example of a geographic coverage area 110 described with reference to FIG. 1. In the wireless communications system 200, the UE 115-a may transmit interleaved PUSCH transmissions 225 and 230 to the base station.

The UE 115-a may transmit, to the base station 105-a, a capability message 210 indicating that the UE 115-a is capable of interleaving PUSCH transmissions. A capability of the UE 115-a to interleave PUSCH messages may be determined by a hardware capability of the UE 115-a, for example a size of a buffer of the UE 115-a that is allocated for buffering PUSCH messages. In some examples, the UE 115-a may transmit the capability message 210 in response to receiving a capability request message 205 from the base station 105-a. A capability request message 205 may request an indication of the capability of the UE 115-a to support interleaving two or more PUSCH transmissions.

In some examples, the capability message 210 may also indicate a total number of interleaved PUSCH messages that the UE 115-a is capable of supporting per component carrier associated with the UE 115-a. In some examples, the UE 115-a may transmit, to the base station 105-a, an indication of a total number of interleaved PUSCH messages that the UE 115-a is capable of supporting per component carrier associated with the UE 115-a in a second message. In some examples, the capability message 210 may also indicate a total number of interleaved PUSCH messages that the UE 115-a is capable of supporting across all component carriers associated with the UE 115-a. In some examples, the UE 115-a may transmit, to the base station 105-a, an indication of a total number of interleaved PUSCH messages that the UE 115-a is capable of supporting across all component carriers associated with the UE 115-a in a second message.

In response to receiving the capability message 210 indicating that the UE 115-a is capable of interleaving PUSCH messages, the base station 105-a may transmit, to the UE 115-a, a first uplink grant 215 scheduling a first PUSCH message 225 and a second uplink grant 220 scheduling a second PUSCH message 230 which may have a duration that is temporally overlapping with a duration of the first scheduled PUSCH message 225. In some examples, one or both of the first uplink grant 215 and the second uplink grant 220 may be a configured grant. In some examples, one or both of the first uplink grant 215 and the second uplink grant 220 may be a dynamic grant transmitted in DCI.

In response to receiving the first uplink grant 215 and the second uplink grant 220, the UE 115-a may transmit, to the base station 105-a, the first PUSCH message 225 and the second PUSCH message 230 interleaved. In some examples, the base station 105-a may transmit the second uplink grant 220 prior to receiving all repetitions of the first PUSCH message 225 from the UE 115-a. In some examples, the base station 105-a may transmit the second uplink grant 220 prior to receiving an entire transport block of the first PUSCH message 225, which may be sent over multiple slots. In some examples, the second uplink grant 220 may schedule the UE 115-a to begin transmission of the second PUSCH message 230 prior to transmission of all repetitions of the first PUSCH message 225. In some examples, the second uplink grant may schedule the UE 115-a to begin transmission of the second PUSCH message 230 prior to transmission of an entire transport block of the first PUSCH message 225 which may be sent over multiple slots.

In some examples, the UE 115-a may buffer a first payload associated with the first PUSCH message 225 prior to the transmission of the first PUSCH message 225 and the UE 115-a may buffer a second payload associated with the second PUSCH message 230 prior to transmission of the second PUSCH message 230, where the first PUSCH message 225 and the second PUSCH message 230 are interleaved. In some examples, the UE 115-a may buffer a first payload associated with the first PUSCH message 225 and a second payload associated with the second PUSCH message 230 prior to transmission of an entire transport block of the first PUSCH message 225 which may be sent over multiple slots. In some examples, the UE 115-a may encode a first payload associated with the first PUSCH message 225 prior to the transmission of the first PUSCH message 225 and a second payload associated with the second PUSCH message 230 prior to the transmission of the second PUSCH message 230, where the first PUSCH message 225 and the second PUSCH message 230 are interleaved. In some examples, the UE 115-a may encode a first payload associated with the first PUSCH message 225 prior to the transmission of the first PUSCH message 225 and a second payload associated with the second PUSCH message 230 prior to prior to buffering the first and second payloads. In some examples, the UE 115-a may buffer an unencoded payload associated with the second PUSCH message 230, then encode the payload associated with the second PUSCH message 230 prior to transmitting the second PUSCH message 230.

Figure 3:
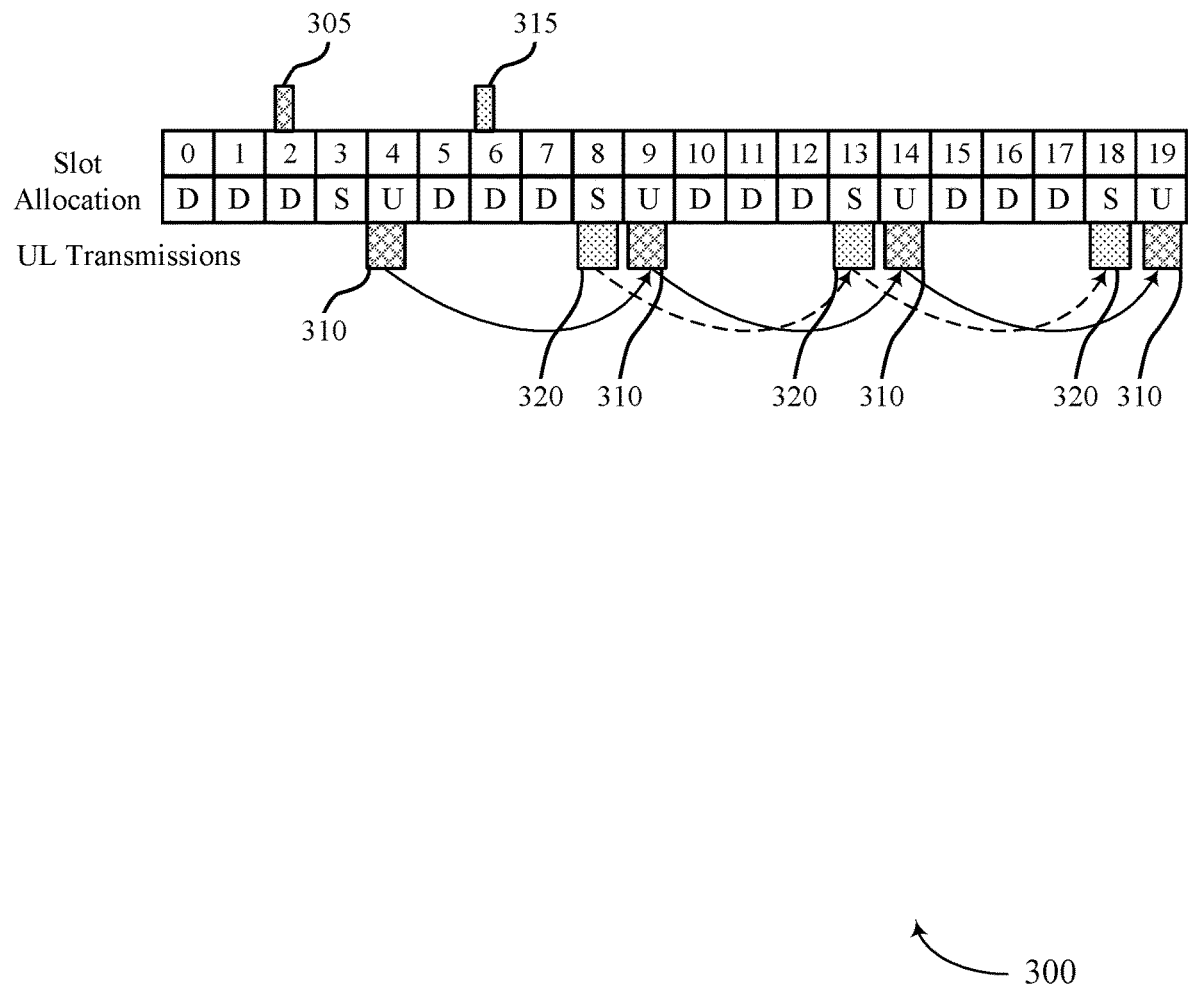
FIG. 3 illustrates an example of a timeline that supports interleaved PUSCH transmissions in accordance with aspects of the present disclosure.

FIG. 3 illustrates an example of a timeline 300 that supports interleaved PUSCH transmissions in accordance with aspects of the present disclosure. Timeline 300 may be implemented by one or more wireless devices, such as a UE or a base station, which may be examples of corresponding devices described with reference to wireless communications systems 100 or 200.

The base station may configure the UE with resource allocation information. For example, the UE may be configured with a TDM configuration, where each TTI is allocated as an uplink TTI (e.g., U), a downlink TTI (e.g., D), or a special (e.g., flexible) TTI (e.g., S). Some or all symbols in an S TTI may be allocated for uplink signaling, and some or all symbols in the S TTI may be allocated for downlink signaling. In some examples, a TDM resource allocation may include a pattern of U, D, and S TTIs. An illustrative example pattern may be: DDDSUDDDSU. Such a pattern may repeat itself over time (e.g., across various TTIs).

In some examples, the base station may transmit, to the UE, a dynamic grant for a PUSCH message. For example, the base station may transmit a dynamic uplink grant 305 during slot 2 (e.g., a D slot). The uplink grant may indicate uplink resources in a subsequent U slot (e.g., slot 4). In some examples, the PUSCH message 310 scheduled in slot 4 by uplink grant 305 may be repeated in multiple slots (e.g., slots 9, 14, and 19). For example, the PUSCH message 310 may be repeated until the UE receives an acknowledgment from the base station that the PUSCH message was successfully received. In some examples, the uplink grant 305 may schedule the PUSCH message 310 across multiple slots.

In some examples, the PUSCH message 310 may be scheduled by a configured grant instead of a dynamic grant. For example, the base station may transmit, to the UE, configuration information (e.g., via control signaling) indicating one or more CG-PUSCH occasions (e.g., PUSCH transmissions 310 may be CG PUSCH occasions).

In some examples, in response to receiving an indication that the UE is capable of interleaving PUSCH messages, the base station may schedule two or more PUSCH transmissions having overlapping durations. For example, the base station may transmit a dynamic uplink grant 315 during slot 6 (e.g., a D slot). The uplink grant 315 may indicate uplink resources in a subsequent S slot (e.g., slot 8). The PUSCH message 320 scheduled in slot 8 may be scheduled to be transmitted prior to the transmission of all repetitions of the first scheduled PUSCH message 310 (e.g., in U slots 9, 14, and 19). The PUSCH message 320 may repeat across multiple slots (e.g., S slots 8, 13, and 18).

As illustrated, the UE may buffer payloads associated with the first PUSCH message 310 and the second PUSCH message 320 simultaneously. For example, at slot 7, the UE may buffer payloads associated with the first PUSCH message 310 and the second PUSCH message 320 prior to transmission of the second PUSCH message 320 at slot 8 and the first PUSCH message at slot 9.

Figure 4:
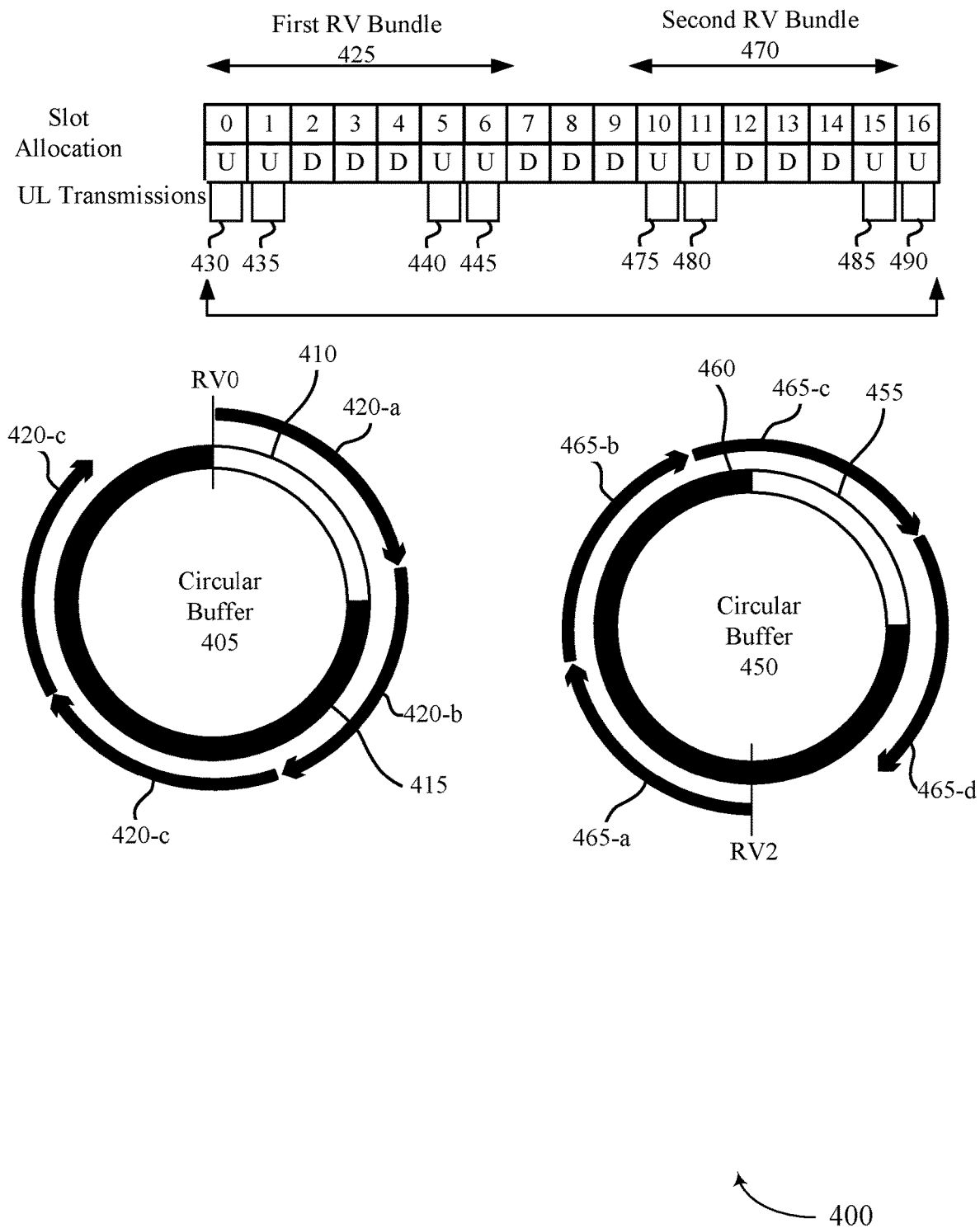
FIG. 4 illustrates an example of a timeline that supports interleaved PUSCH transmissions in accordance with aspects of the present disclosure.

FIG. 4 illustrates an example of a timeline 400 that supports interleaved PUSCH transmissions for a Type-2 PUSCH message in accordance with aspects of the present disclosure. Timeline 400 may be implemented by one or more wireless devices, such as a UE or a base station, which may be examples of corresponding devices described with reference to wireless communications system 100 or resource configuration 200.

The base station may configure the UE with resource allocation information. For example, the UE may be configured with a TDM configuration, where each TTI is allocated as an uplink TTI (e.g., U) or a downlink TTI (e.g., D). In some examples, a TDM resource allocation may include a pattern of U and D TTIs. An illustrative example pattern may be: UUDDDUUDDDUUDDD. Such a pattern may repeat itself over time (e.g., across various TTIs).

A transport block size for a type-2 PUSCH message may be determined based on all slots allocated to a PUSCH transmission, whereas in conventional type-1 PUSCH messages, a transport block size may be determined based solely on the first allocated slot. As compared with type-1 PUSCH messages, type-2 PUSCH messages may have an enhanced rate match of encoded bits and enhancements to redundancy version (RV) cycling, which may allow for transmitting small payloads with greater efficiency. Type-2 PUSCH messages may be particularly useful for supporting or extending coverage of voice over IP.

A type-2 PUSCH message may be transmitted over multiple slots, as illustrated in FIG. 4. For example, a UE may include circular buffers 405 and 450 that buffer first and second RV bundles (425 and 470). The first circular buffer 405 may buffer systematic bits 410 and parity bits 415, and the UE may transmit the bits from the first circular buffer 405 over transport blocks in a sequential manner over several slots. For example, the UE may transmit bits 420-*a* in slot 0 in transmission 430 and save the remainder of the bits in the circular buffer 405 in memory. The UE may transmit bits 420-*b* in slot 1 in transmission 435 and save the remainder of the bits in the circular buffer 405 in memory. The UE may transmit bits 420-*c* in slot 5 in transmission 440 and save the remainder of the bits in the circular buffer 405 in memory. The UE may transmit bits 420-*d* in slot 6 in transmission 445 and save the remainder of the bits in the circular buffer 405 in memory. Accordingly, a first RV bundle 425 associated with a first type-2 PUSCH message may be sent over four uplink slots (0, 1, 5, and 6).

The first slot may be determined by RV0, followed by a per-slot rate matching and interleaving in each slot. The start index for slot 0 (the first transmission 430) may be point RV0 in the circular buffer 405. The start index for slot 1 (the second transmission 435) may be calculated as RV0 plus a first offset. The start index for slot 5 (the third transmission 440) may be calculated as RV0 plus a second offset. The start index for slot 6 (the fourth transmission 445) may be calculated as RV0 plus a third offset. Offsets may be calculated as the number of slots in the RV bundle multiplied by the modulation order multiplied by the number of layers, taking into account DMRS and the number of physical RBs for overhead. The offsets may not take an uplink control information (UCI) index into account when computing the offsets. The start indices may be computed prior to transmitting on slot 0 without taking UCI multiplexing into account. Rate matching may be performed per slot.

The second circular buffer 450 may similarly buffer systematic bits 455 and parity bits 460, and the UE may transmit the bits from the second circular buffer 450 over transport blocks in a sequential manner over several slots. For example, the UE may transmit bits 465-*a* in slot 10 in transmission 475 and save the remainder of the bits in the circular buffer 450 in memory. The UE may transmit bits 465-*b* in slot 11 in transmission 480 and save the remainder of the bits in the circular buffer 405 in memory. The UE may transmit bits 465-*c* in slot 15 in transmission 485 and save the remainder of the bits in the circular buffer 405 in memory. The UE may transmit bits 465-*d* in slot 16 in transmission 490 and save the remainder of the bits in the circular buffer 405 in memory. Accordingly, a second RV bundle 470 associated with a second type-2 PUSCH message may be sent over four uplink slots (10, 11, 15, and 16).

For the second RV bundle 470, the first slot (e.g., slot 10) may be determined by RV2, followed by per-slot rate matching and interleaving in each slot. The offsets for each slot of the second RV bundle 470 may be calculated similarly to the offsets for the first RV bundle 425.

As described herein, a UE may interleave two or more type-2 PUSCH messages. In some examples, a UE may interleave a type-2 PUSCH message with a type-1 (e.g., a conventional) PUSCH message. In some examples, a UE may interleave two or more type-1 PUSCH messages.

Figure 5:
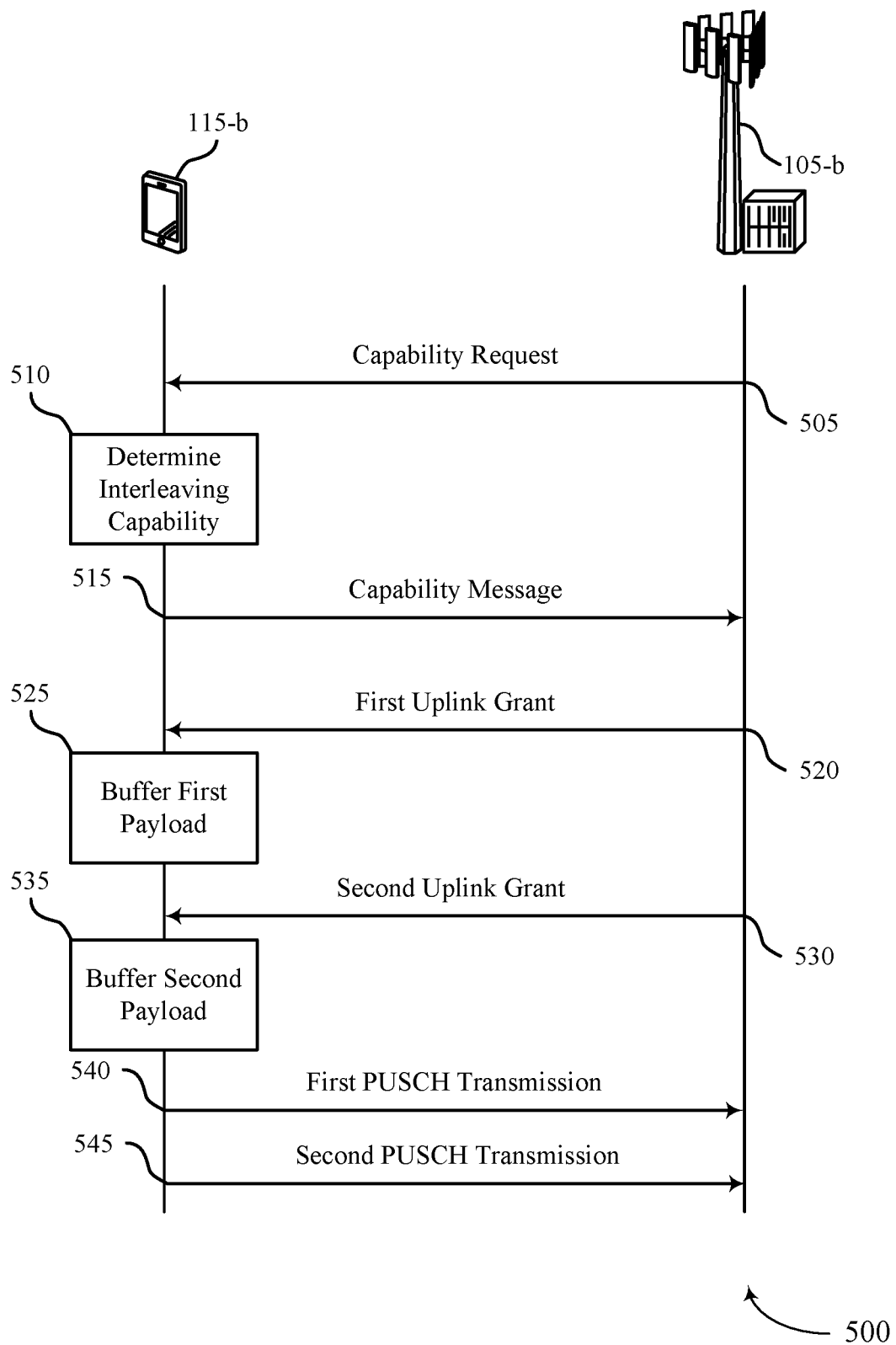
FIG. 5 illustrates an example of a process flow that supports interleaved PUSCH transmissions in accordance with aspects of the present disclosure.

FIG. 5 illustrates an example of a process flow 500 that supports interleaved PUSCH transmissions in accordance with aspects of the present disclosure. Process flow 500 may implement aspects of or may be implemented by aspects of wireless communications systems 100 or 200. For example, base station 105-b may be an example of a base station 105 as described herein, and UE 115-b may be an example of a UE 115 as described herein.

At 505, the base station 105-b may transmit, to the UE 115-b, a capability request message. The capability request message may request an indication of the capability of the UE 115-b to support interleaving of two or more PUSCH messages.

At 510, the UE 115-b may determine whether the UE 115-b is capable of interleaving PUSCH messages. For example, the UE 115-b may determine whether the UE 115-b is capable of interleaving PUSCH messages based on a buffer size of the UE 115-b that is allocated for buffering PUSCH messages.

At 515, the UE 115-b may transmit, to the base station 105-b, a capability message indicating whether the UE 115-b is capable of interleaving PUSCH transmissions. If the UE 115-b indicates that the UE 115-b is not capable of interleaving PUSCH messages, then the base station 105-b may not schedule PUSCH messages for the UE 115-b that have temporally overlapping durations. If the UE 115-b indicates that the UE 115-b is capable of supporting interleaved PUSCH messages, then the base station 105-b may schedule PUSCH messages for the UE 115-b that have temporally overlapping durations. In some examples, the capability message sent at 515 may also indicate a total number of interleaved PUSCH messages that the UE 115-b is capable of supporting per component carrier associated with the UE 115-b. In some examples, the UE 115-b may transmit, to the base station 105-b, an indication of a total number of interleaved PUSCH messages that the UE 115-b is capable of supporting per component carrier associated with the UE 115-b in a second message. In some examples, the capability message sent at 515 may also indicate a total number of interleaved PUSCH messages that the UE 115-b is capable of supporting across all component carriers associated with the UE 115-b. In some examples, the UE 115-b may transmit, to the base station 105-b, an indication of a total number of interleaved PUSCH messages that the UE 115-b is capable of supporting across all component carriers associated with the UE 115-b in a second message.

At 520, in response to receiving the capability message at 515 indicating that the UE 115-b is capable of interleaving PUSCH messages, the base station 105-b may transmit, to the UE 115-b, a first uplink grant scheduling a first PUSCH message. At 525, the UE 115-b may buffer a first payload associated with the first PUSCH message scheduled by the first uplink grant.

At 530, the base station 105-b may transmit, to the UE 115-b, a second uplink grant scheduling a second PUSCH message which may be have a duration which is temporally overlapping with a duration of the first PUSCH message scheduled in the uplink grant transmitted at 520. At 535, the UE 115-b may buffer a second payload associated with the first PUSCH message scheduled by the first uplink grant.

In some examples, one or both of the first uplink grant transmitted at 520 and the second uplink grant transmitted at 530 may be a configured grant. In some examples, one or both of the first uplink grant transmitted at 520 and the second uplink grant transmitted at 530 may be a dynamic grant transmitted in DCI.

At 540, the UE 115-b may transmit the first PUSCH message to the base station 105-b. At 545, the UE 115-b may transmit the first PUSCH message to the base station 105-b interleaved with the first PUSCH message transmitted at 540.

In some examples, the UE 115-b may buffer a first payload associated with the first PUSCH message prior to the transmission of the first PUSCH message and the UE 115-b may buffer a second payload associated with the second PUSCH message prior to transmission of the second PUSCH message, where the first PUSCH message 225 and the second PUSCH message 230 are interleaved. In some examples, the UE 115-b may buffer the first payload associated with the first PUSCH message and the second payload associated with the second PUSCH message prior to transmission of all repetitions of the first PUSCH message at 540. In some examples, the UE 115-b may buffer the first payload associated with the first PUSCH message and the second payload associated with the second PUSCH message prior to transmission of an entire transport block of the first PUSCH message at 540, which may be sent over multiple slots. In some examples, the UE 115-b may encode the first payload associated with the first PUSCH message and the second payload associated with the second PUSCH message prior to buffering the first and second payloads. In some examples, the UE 115-b may encode a first payload associated with the first PUSCH message prior to the transmission of the first PUSCH message and a second payload associated with the second PUSCH message prior to the transmission of the second PUSCH message, where the first PUSCH message and the second PUSCH message are interleaved. In some examples, the UE 115-b may buffer an unencoded payload associated with the second PUSCH message, then encode the payload associated with the second PUSCH message prior to transmitting the second PUSCH message at 545.

In some examples, both the first PUSCH message and the second PUSCH message may be type-1 PUSCH messages. In some examples, both the first PUSCH message and the second PUSCH message may be type-2 PUSCH (e.g., TBoMS) messages. In some examples, one of the first or second PUSCH messages may be a type-1 PUSCH message and the other, interleaved, PUSCH message may be a type-2 PUSCH message. In some examples, the base station 105-b may transmit more than two uplink grants that schedule overlapping PUSCH transmissions, and the UE 115-b may interleave more than two PUSCH messages. For example, in some cases the base station 105-b may schedule as many PUSCH transmissions having temporally overlapping durations as the UE 115-b indicated that the UE 115-b is capable of interleaving (e.g., per component carrier or across all component carriers).

Figure 6:
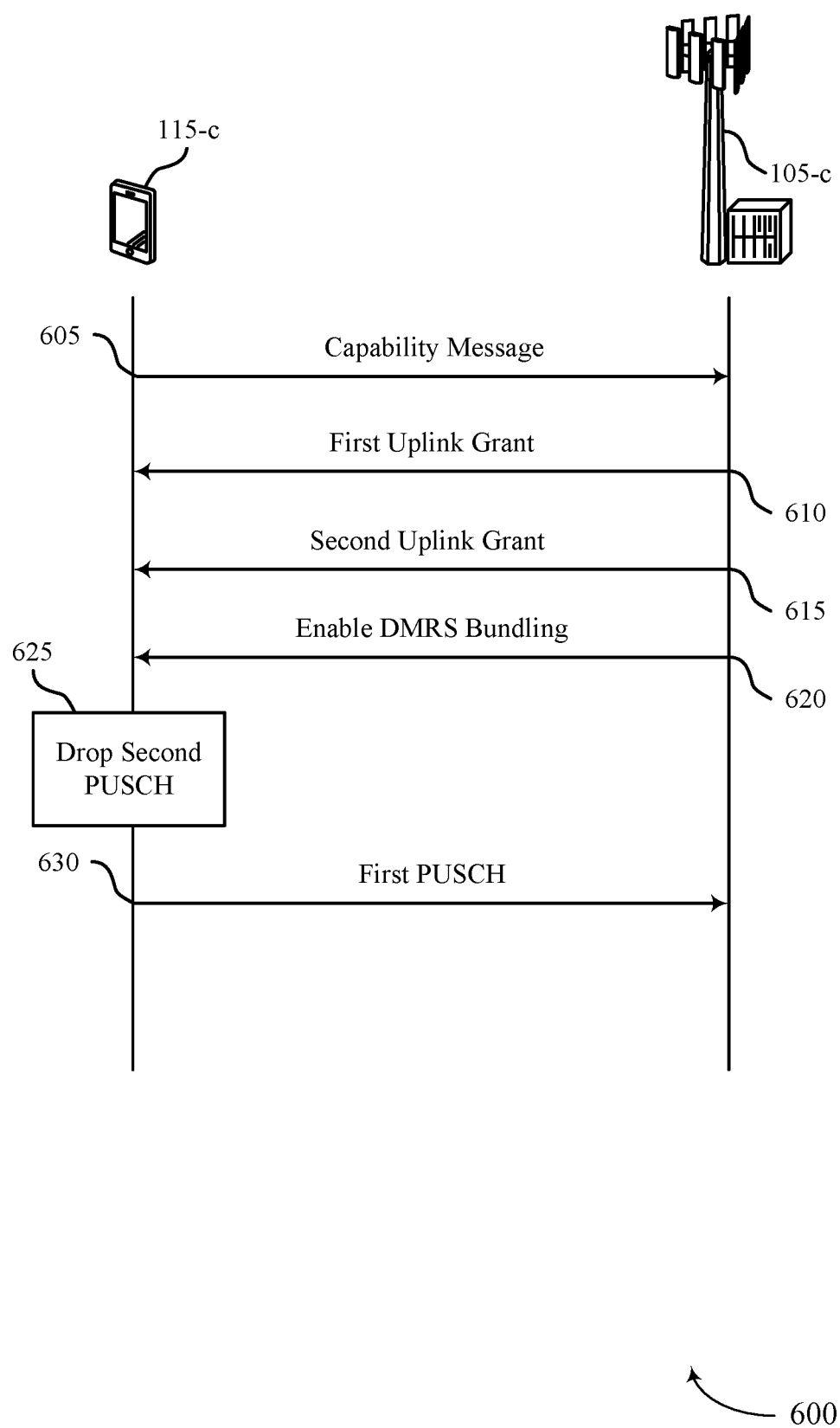
FIG. 6 illustrates an example of a process flow that supports interleaved PUSCH transmissions in accordance with aspects of the present disclosure.

FIG. 6 illustrates an example of a process flow 600 that supports interleaved PUSCH transmissions in accordance with aspects of the present disclosure. Process flow 600 may implement aspects of or may be implemented by aspects of wireless communications systems 100 or 200. For example, base station 105-c may be an example of a base station 105 as described herein, and UE 115-c may be an example of a UE 115 as described herein.

At 605, the UE 115-c may transmit, to the base station 105-c, a capability message indicating whether the UE 115-c is capable of interleaving PUSCH transmissions. In some examples, the UE 115-c may transmit the capability message in response to receiving a capability request message from the base station 105-c, for example as described herein. If the UE 115-c indicates that the UE 115-c is not capable of interleaving PUSCH messages, then the base station 105-c may not schedule PUSCH messages for the UE 115-c that have temporally overlapping durations. If the UE 115-c indicates that the UE 115-c is capable of interleaving PUSCH messages, then the base station 105-c may schedule PUSCH messages for the UE 115-c that are have temporally overlapping durations.

At 610, the base station 105-c may transmit, to the UE 115-c, a first uplink grant scheduling a first PUSCH message.

At 615, the base station 105-c may transmit, to the UE 115-c, a second uplink grant scheduling a second PUSCH message which may have a duration that is temporally overlapping with a duration of the first PUSCH message scheduled in the uplink grant transmitted at 610.

At 620, the base station 105-c may transmit, to the UE 115-c, a message enabling DMRS bundling for at least one of the first PUSCH message or the second PUSCH message. In some examples, a wireless communications system may support DMRS bundling. DMRS bundling may allow a receiving device (e.g., a base station 105-c) to use DMRSs from multiple TTIs (e.g., slots, symbols, mini-slots, or the like) to perform channel estimation. Thus, a joint channel estimation (e.g., across multiple slots) may be more robust and more accurate than a channel estimation for a single slot.

To support DMRS bundling, a UE (e.g., UE 115-c) may maintain phase continuity across respective transmissions (e.g., different TBs). Maintaining phase continuity may be referred to as bundling and may include using a same set of parameters for transmitting multiple TBs (e.g., a same frequency resource, transmit power, spatial transmit relation, antenna ports, precoding, or the like). When a UE (e.g., UE 115-c) transmits across multiple slots, phase jumps may occur across slots, for example depending on the UE implementation. A linear, continuous phase ramp across all slots may be desirable. In some cases, due to intervening events or transmissions on other channels, continuation of the phase ramp may not be maintained, which may result in a phase discontinuity when crossing slot boundaries. Discontinuity may also occur at other locations, such as symbol boundaries, depending on the nature of the interruption. As described herein, DMRS bundling may be used to maintain phase continuity.

In some examples, base station 105-c may transmit, to UE 115-c, control signaling instructing UE 115-c to maintain phase continuity across multiple uplink channels that include the first uplink channel and the second uplink channel. For example, base station 105-c may transmit, to the UE 115-c, control signaling that enables DMRS bundling for at least one of the first scheduled PUSCH transmission or the second scheduled PUSCH transmission.

The UE 115-c may not be capable of both interleaving a first and second PUSCH message and performing DMRS bundling for the PUSCH messages. Accordingly, the UE 115-c may perform a cancellation operation if the UE 115-c receives, at 610 and 615, uplink grants scheduling PUSCH transmissions having overlapping durations and, at 620, an indication that DMRS bundling is enabled for at least one of the scheduled PUSCH transmissions. For example, at 625, the UE 115-c may drop the second PUSCH message scheduled by the uplink grant received at 615. The UE 115-c may transmit the first PUSCH message to the base station 105-c using DMRS bundling. In some examples, the UE 115-c may also transmit an indication to the base station 105-c that the second PUSCH message was dropped. In some examples, the UE 115-c may transmit, to the base station 105-c, the first PUSCH message using DMRS bundling, and then transmit the second PUSCH message also using DMRS bundling, after all of one or more repetitions of the first PUSCH message have been transmitted (e.g., the UE 115-c may not interleave the first and second PUSCH messages).

Figure 7:
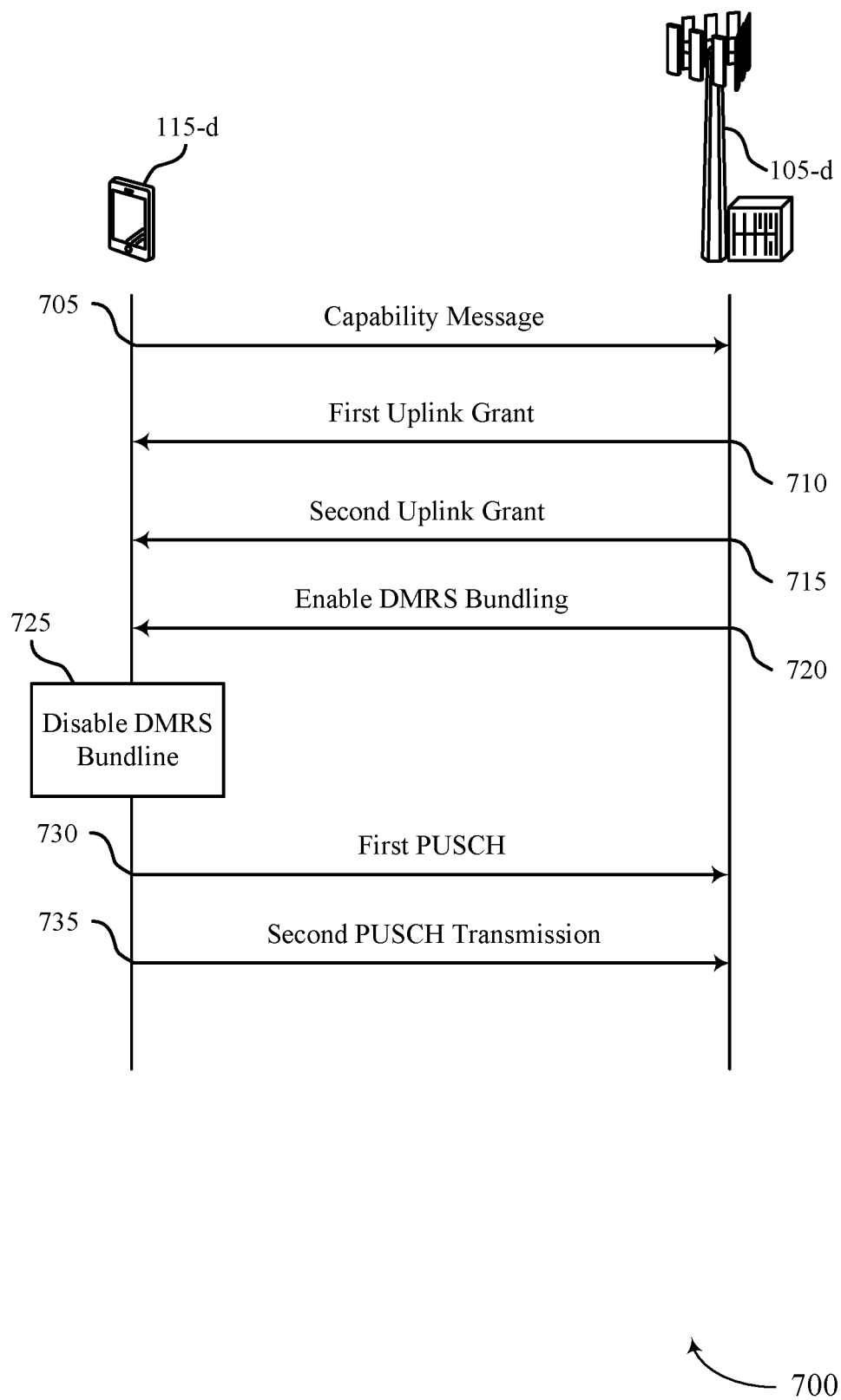
FIG. 7 illustrates an example of a process flow that supports interleaved PUSCH transmissions in accordance with aspects of the present disclosure.

FIG. 7 illustrates an example of a process flow 700 that supports interleaved PUSCH transmissions in accordance with aspects of the present disclosure. Process flow 700 may implement aspects of or may be implemented by aspects of wireless communications systems 100 or 200. For example, base station 105-d may be an example of a base station 105 as described herein, and UE 115-d may be an example of a UE 115 as described herein.

At 705, the UE 115-d may transmit, to the base station 105-d, a capability message indicating whether the UE 115-d is capable of interleaving PUSCH transmissions. In some examples, the UE 115-d may transmit the capability message in response to receiving a capability request message from the base station 105-d, for example as described herein. If the UE 115-d indicates that the UE 115-d is not capable of interleaving PUSCH messages, then the base station 105-d may not schedule PUSCH messages for the UE 115-d that have temporally overlapping durations. If the UE 115-d indicates that the UE 115-d is capable of interleaving PUSCH messages, then the base station 105-d may schedule PUSCH messages for the UE 115-d that have temporally overlapping durations.

At 710, the base station 105-d may transmit, to the UE 115-d, a first uplink grant scheduling a first PUSCH message.

At 715, the base station 105-d may transmit, to the UE 115-d, a second uplink grant scheduling a second PUSCH message which may have a duration that is temporally overlapping with a duration of the first PUSCH message scheduled in the uplink grant transmitted at 710.

At 720, the base station 105-d may transmit, to the UE 115-d, a message enabling DMRS bundling for at least one of the first PUSCH message or the second PUSCH message.

The UE 115-d may not be capable of both interleaving a first and second PUSCH message and performing DMRS bundling for the PUSCH messages.

Accordingly, the UE 115-d may perform a cancellation operation if the UE 115-d receives, at 710 and 715, uplink grants scheduling PUSCH transmissions that have temporally overlapping durations, and, at 720, an indication that DMRS bundling is enabled for at least one of the scheduled PUSCH transmissions. For example, at 725, the UE 115-d may disable DMRS bundling for the indicated first and/or second PUSCH messages.

At 730, the UE 115-d may transmit, to the base station 105-d, the first PUSCH message. At 735, the UE 115-d may transmit, to the base station 105-d, the second PUSCH message interleaved with the first PUSCH message.

Figure 8:
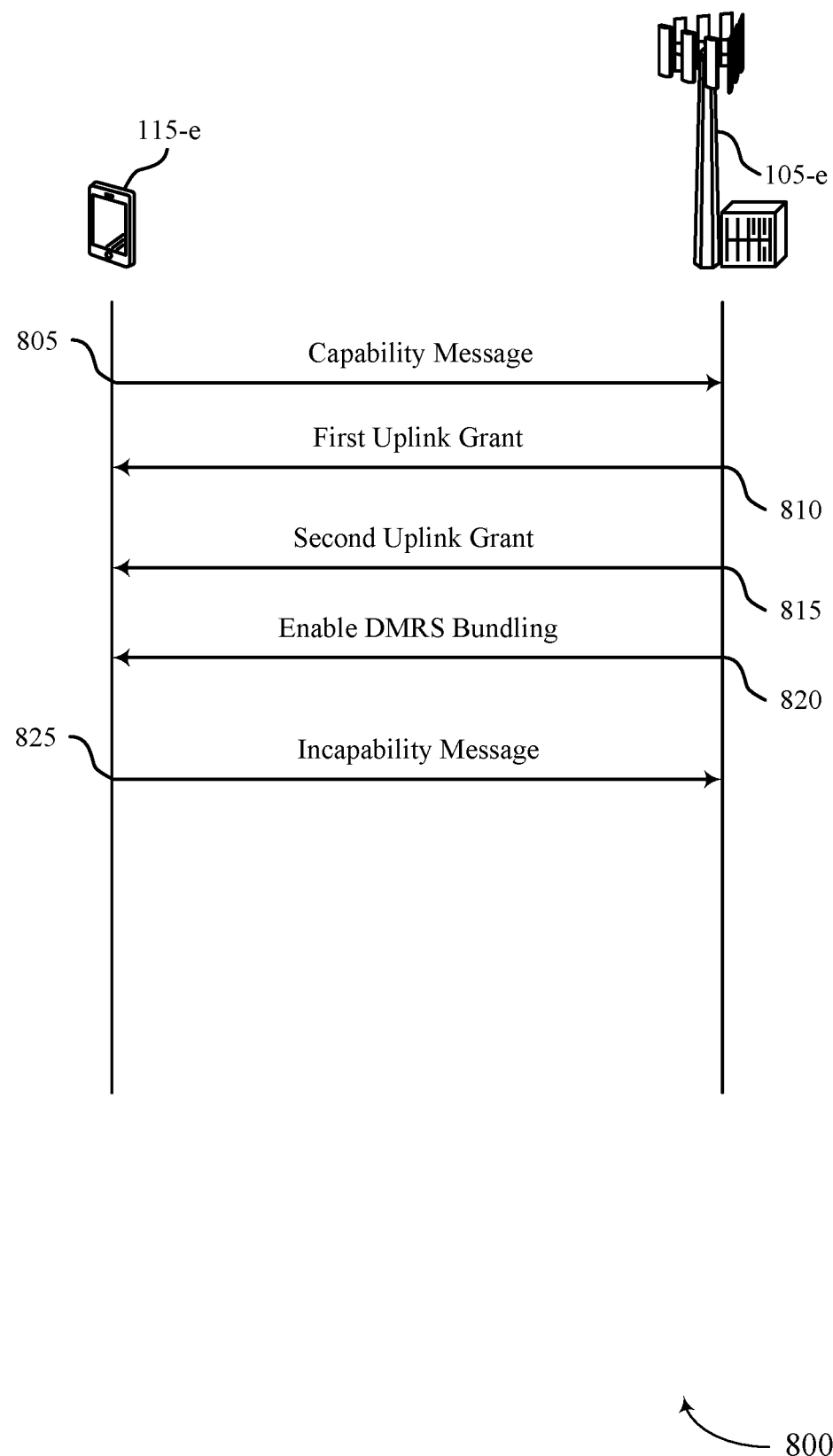
FIG. 8 illustrates an example of a process flow that supports interleaved PUSCH transmissions in accordance with aspects of the present disclosure.

FIG. 8 illustrates an example of a process flow 800 that supports interleaved PUSCH transmissions in accordance with aspects of the present disclosure. Process flow 800 may implement aspects of or may be implemented by aspects of wireless communications systems 100 or 200. For example, base station 105-e may be an example of a base station 105 as described herein, and UE 115-e may be an example of a UE 115 as described herein.

At 805, the UE 115-e may transmit, to the base station 105-e, a capability message indicating whether the UE 115-e is capable of interleaving PUSCH transmissions. In some examples, the UE 115-e may transmit the capability message in response to receiving a capability request message from the base station 105-*e*, for example as described herein. If the UE 115-*e* indicates that the UE 115-*e* is not capable of interleaving PUSCH messages, then the base station 105-*e* may not schedule PUSCH messages for the UE 115-*e* that have temporally overlapping durations. If the UE 115-*e* indicates that the UE 115-*e* is capable of interleaving PUSCH messages, then the base station 105-*e* may schedule PUSCH messages for the UE 115-*e* that have temporally overlapping durations.

At 810, the base station 105-*e* may transmit, to the UE 115-*e*, a first uplink grant scheduling a first PUSCH message.

At 815, the base station 105-*e* may transmit, to the UE 115-*e*, a second uplink grant scheduling a second PUSCH message which may have a duration that is temporally overlapping with a duration of the first PUSCH message scheduled in the uplink grant transmitted at 810.

At 820, the base station 105-*e* may transmit, to the UE 115-*e*, a message enabling DMRS bundling for at least one of the first PUSCH message or the second PUSCH message.

The UE 115-*e* may not be capable of both interleaving a first and second PUSCH message and performing DMRS bundling for the PUSCH messages.

Accordingly, the UE 115-*e* may perform a cancellation operation if the UE 115-*e* receives, at 810 and 815, uplink grants scheduling PUSCH transmissions having temporally overlapping durations and, at 820, an indication that DMRS bundling is enabled for at least one of the scheduled PUSCH transmissions. For example, at 825, the UE 115-*e* may transmit an incapability message to the base station 105-*e* indicating that the UE 115-*e* is not capable of interleaving a first and second PUSCH message and performing DMRS bundling for the PUSCH messages. In some examples, in response to receiving the incapability message, the base station 105-*e* may reschedule the PUSCH transmissions such that the PUSCH transmissions do not have temporally overlapping durations. For example, the base station 105-*e* may transmit, to the UE 115-*e*, additional uplink grants for PUSCH transmissions that do not have temporally overlapping durations. In some examples, in response to receiving the incapability message, the base station 105-*e* may transmit, to the UE 115-*e*, a message disabling DMRS bundling for the PUSCH transmission(s).

Figure 9:
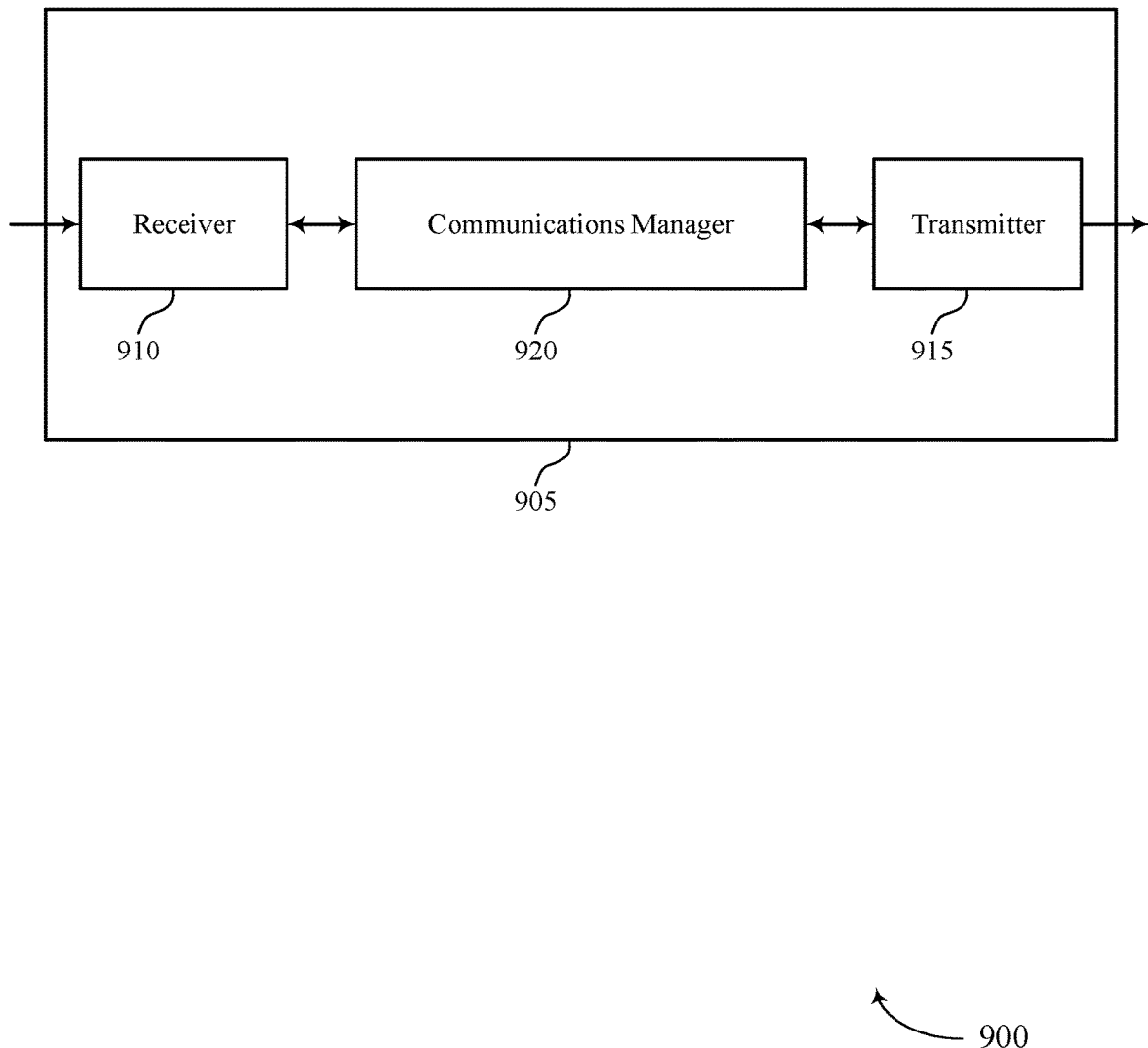
FIGS. 9 and 10 show block diagrams of devices that support interleaved PUSCH transmissions in accordance with aspects of the present disclosure.

FIG. 9 shows a block diagram 900 of a device 905 that supports interleaved PUSCH transmissions in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to interleaved PUSCH transmissions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to interleaved PUSCH transmissions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of interleaved PUSCH transmissions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for transmitting, to a base station, a message indicating a capability of the UE to support interleaving two or more uplink shared channel messages. The communications manager 920 may be configured as or otherwise support a means for receiving, from the base station, a first control message that schedules a first uplink shared channel message. The communications manager 920 may be configured as or otherwise support a means for receiving, from the base station and based on the capability of the UE, a second control message that schedules a second uplink shared channel message, where a duration associated with the second uplink shared channel message at least partially overlaps with a duration associated with the first uplink shared channel message. The communications manager 920 may be configured as or otherwise support a means for transmitting the first and second uplink shared channel messages to the base station, the first and second uplink shared channel messages interleaved based on the capability of the UE.

Additionally or alternatively, the communications manager 920 may support wireless communications at a UE in accordance with examples as disclosed herein. For example, the communications manager 920 may be configured as or otherwise support a means for receiving, from a base station, a first control message that schedules a first uplink shared channel message. The communications manager 920 may be configured as or otherwise support a means for receiving, from the base station, a second control message that schedules a second uplink shared channel message for interleaving with the first uplink shared channel message. The communications manager 920 may be configured as or otherwise support a means for receiving an indication that demodulation reference signal bundling is enabled for at least one of the first uplink shared channel message or the second uplink shared channel message. The communications manager 920 may be configured as or otherwise support a means for performing a cancellation operation based on the indication that reference signal bundling is enabled.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources by interleaving uplink shared channel transmissions and simultaneously buffering payloads associated with the interleaved uplink shared channel transmissions.

Figure 10:
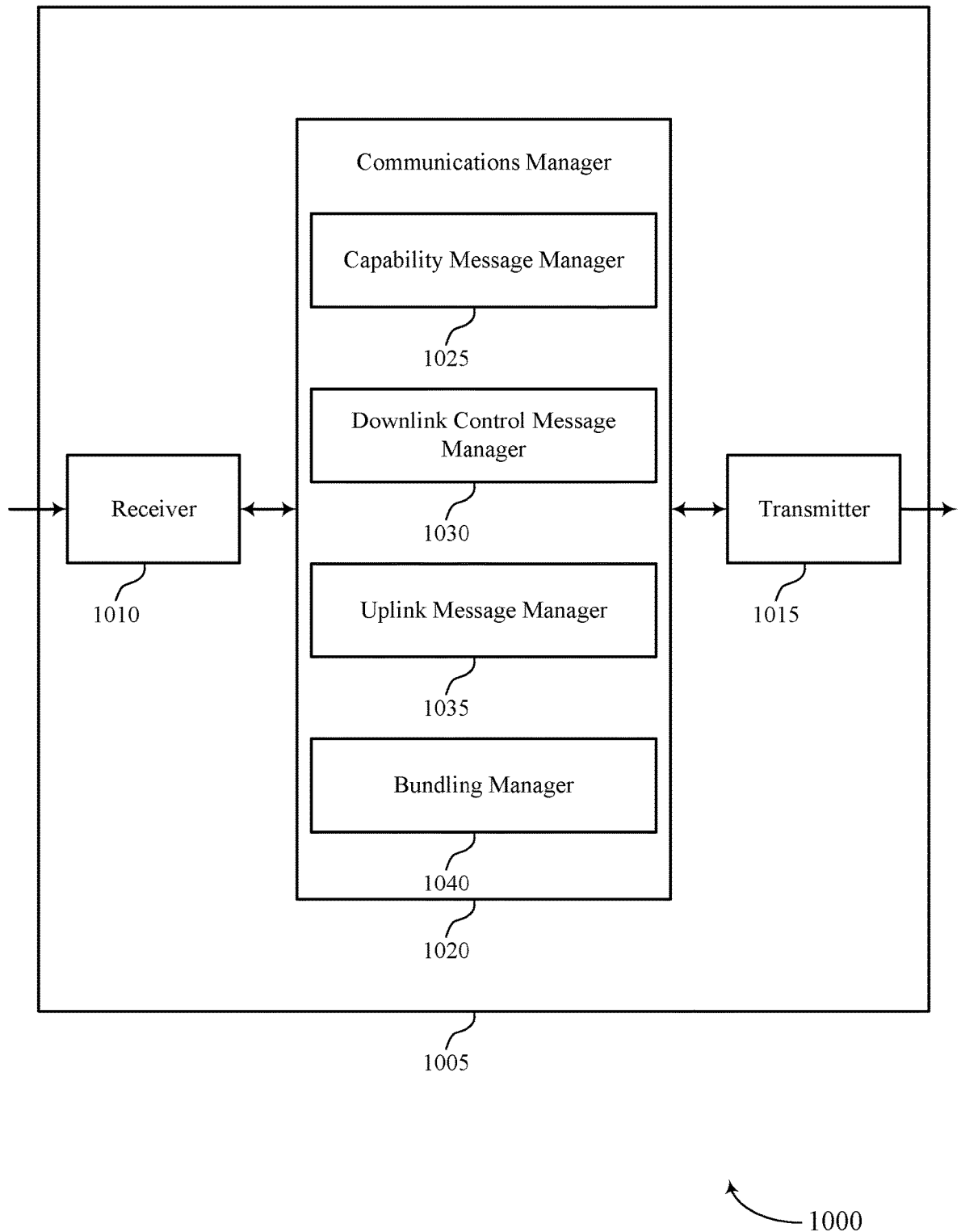

FIG. 10 shows a block diagram 1000 of a device 1005 that supports interleaved PUSCH transmissions in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to interleaved PUSCH transmissions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to interleaved PUSCH transmissions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of interleaved PUSCH transmissions as described herein. For example, the communications manager 1020 may include a capability message manager 1025, a downlink control message manager 1030, an uplink message manager 1035, a bundling manager 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The capability message manager 1025 may be configured as or otherwise support a means for transmitting, to a base station, a message indicating a capability of the UE to support interleaving two or more uplink shared channel messages. The downlink control message manager 1030 may be configured as or otherwise support a means for receiving, from the base station, a first control message that schedules a first uplink shared channel message. The downlink control message manager 1030 may be configured as or otherwise support a means for receiving, from the base station and based on the capability of the UE, a second control message that schedules a second uplink shared channel message, where a duration associated with the second uplink shared channel message at least partially overlaps with a duration associated with the first uplink shared channel message. The uplink message manager 1035 may be configured as or otherwise support a means for transmitting the first and second uplink shared channel messages to the base station, the first and second uplink shared channel messages interleaved based on the capability of the UE.

Additionally or alternatively, the communications manager 1020 may support wireless communications at a UE in accordance with examples as disclosed herein. The downlink control message manager 1030 may be configured as or otherwise support a means for receiving, from a base station, a first control message that schedules a first uplink shared channel message. The downlink control message manager 1030 may be configured as or otherwise support a means for receiving, from the base station, a second control message that schedules a second uplink shared channel message for interleaving with the first uplink shared channel message. The bundling manager 1040 may be configured as or otherwise support a means for receiving an indication that demodulation reference signal bundling is enabled for at least one of the first uplink shared channel message or the second uplink shared channel message. The uplink message manager 1035 may be configured as or otherwise support a means for performing a cancellation operation based on the indication that reference signal bundling is enabled.

Figure 11:
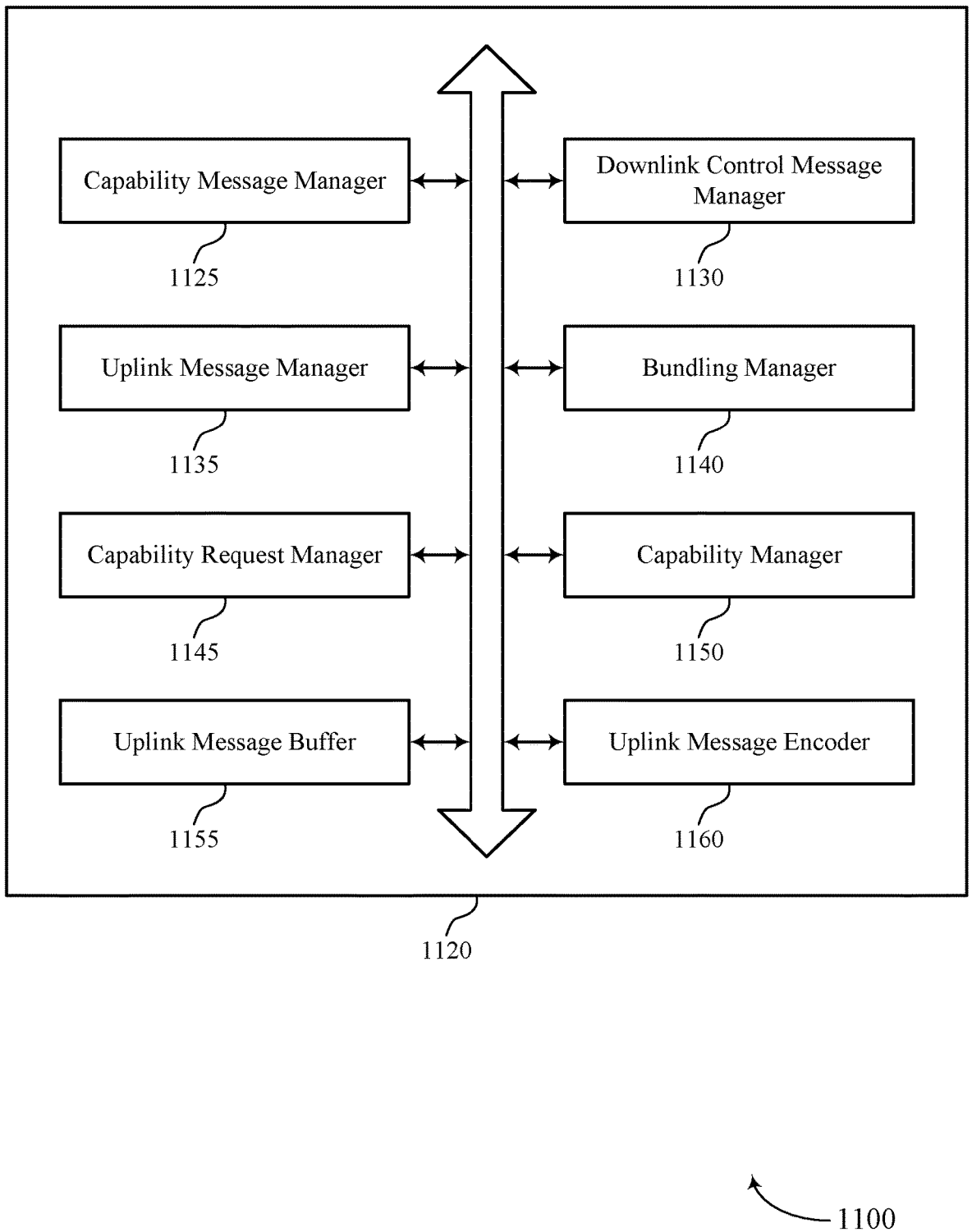
FIG. 11 shows a block diagram of a communications manager that supports interleaved PUSCH transmissions in accordance with aspects of the present disclosure.

FIG. 11 shows a block diagram 1100 of a communications manager 1120 that supports interleaved PUSCH transmissions in accordance with aspects of the present disclosure. The communications manager 1120 may be an example of aspects of a communications manager 920, a communications manager 1020, or both, as described herein. The communications manager 1120, or various components thereof, may be an example of means for performing various aspects of interleaved PUSCH transmissions as described herein. For example, the communications manager 1120 may include a capability message manager 1125, a downlink control message manager 1130, an uplink message manager 1135, a bundling manager 1140, a capability request manager 1145, a capability manager 1150, an uplink message buffer 1155, an uplink message encoder 1160, or any combination thereof. Each of these components may communicate, directly or indirectly, with one another (e.g., via one or more buses).

The communications manager 1120 may support wireless communications at a UE in accordance with examples as disclosed herein. The capability message manager 1125 may be configured as or otherwise support a means for transmitting, to a base station, a message indicating a capability of the UE to support interleaving two or more uplink shared channel messages. The downlink control message manager 1130 may be configured as or otherwise support a means for receiving, from the base station, a first control message that schedules a first uplink shared channel message. In some examples, the downlink control message manager 1130 may be configured as or otherwise support a means for receiving, from the base station and based on the capability of the UE, a second control message that schedules a second uplink shared channel message, where a duration associated with the second uplink shared channel message at least partially overlaps with a duration associated with the first uplink shared channel message. The uplink message manager 1135 may be configured as or otherwise support a means for transmitting the first and second uplink shared channel messages to the base station, the first and second uplink shared channel messages interleaved based on the capability of the UE.

In some examples, the capability message manager 1125 may be configured as or otherwise support a means for transmitting, to the base station, a second message indicating a total number of interleaved uplink shared channel messages the UE is capable of supporting per component carrier associated with the UE.

In some examples, the capability message manager 1125 may be configured as or otherwise support a means for transmitting, to the base station, a second message indicating a total number of interleaved uplink shared channel messages the UE is supporting of interleaving across all component carriers associated with the UE.

In some examples, the capability request manager 1145 may be configured as or otherwise support a means for receiving, from the base station, a request for an indication of the capability of the UE to support transmitting two or more uplink shared channel messages that are interleaved in time.

In some examples, receiving the first control message includes receiving a first dynamic grant, the first dynamic grant scheduling the first uplink shared channel message. In some examples, receiving the second control message includes receiving a second dynamic grant, the second dynamic grant scheduling the second uplink shared channel message.

In some examples, receiving the first control message includes receiving a first configured grant, the first configured grant scheduling the first uplink shared channel message. In some examples, receiving the second control message includes receiving a second configured grant, the second configured grant scheduling the second uplink shared channel message.

In some examples, receiving the first control message includes receiving a configured grant, the configured grant scheduling the first uplink shared channel message. In some examples, receiving the second control message includes receiving a dynamic grant, the dynamic grant scheduling the second uplink shared channel message.

In some examples, the capability manager 1150 may be configured as or otherwise support a means for determining, based on a buffer size of the UE, that the UE has the capability to support transmitting two or more uplink shared channel messages that are interleaved, where the message indicating the capability of the UE to support transmitting two or more uplink shared channel messages that are interleaved is transmitted based on the determining.

In some examples, the uplink message buffer 1155 may be configured as or otherwise support a means for buffering a first encoded payload associated with the first uplink shared channel message. In some examples, the uplink message manager 1135 may be configured as or otherwise support a means for buffering a second encoded payload associated with the second uplink shared channel message.

In some examples, the uplink message encoder 1160 may be configured as or otherwise support a means for encoding a first payload associated with the first uplink shared channel message before transmission of the first uplink shared channel message. In some examples, the uplink message encoder 1160 may be configured as or otherwise support a means for encoding a second payload associated with the second uplink shared channel message before transmission of the second uplink shared channel message.

In some examples, the first uplink shared channel message is a type-1 uplink shared channel message and the second uplink shared channel message is a type-2 uplink shared channel message.

Additionally or alternatively, the communications manager 1120 may support wireless communications at a UE in accordance with examples as disclosed herein. In some examples, the downlink control message manager 1130 may be configured as or otherwise support a means for receiving, from a base station, a first control message that schedules a first uplink shared channel message. In some examples, the downlink control message manager 1130 may be configured as or otherwise support a means for receiving, from the base station, a second control message that schedules a second uplink shared channel message for interleaving with the first uplink shared channel message. The bundling manager 1140 may be configured as or otherwise support a means for receiving an indication that demodulation reference signal bundling is enabled for at least one of the first uplink shared channel message or the second uplink shared channel message. In some examples, the uplink message manager 1135 may be configured as or otherwise support a means for performing a cancellation operation based on the indication that reference signal bundling is enabled.

In some examples, to support performing the cancellation operation, the uplink message buffer 1155 may be configured as or otherwise support a means for transmitting, to the base station, the first uplink shared channel message using demodulation reference signal bundling. In some examples, to support performing the cancellation operation, the uplink message manager 1135 may be configured as or otherwise support a means for dropping the second uplink shared channel message.

In some examples, to support performing the cancellation operation, the uplink message manager 1135 may be configured as or otherwise support a means for transmitting, to the base station, the second uplink shared channel message using demodulation reference signal bundling. In some examples, to support performing the cancellation operation, the uplink message manager 1135 may be configured as or otherwise support a means for dropping the first uplink shared channel message.

In some examples, to support performing the cancellation operation, the uplink message manager 1135 may be configured as or otherwise support a means for transmitting, to the base station, the first uplink shared channel message using demodulation reference signal bundling. In some examples, to support performing the cancellation operation, the uplink message manager 1135 may be configured as or otherwise support a means for transmitting, to the base station, the second uplink shared channel message using demodulation reference signal bundling after transmission of all of one or more repetitions of the first uplink shared channel message.

In some examples, to support performing the cancellation operation, the bundling manager 1140 may be configured as or otherwise support a means for disabling demodulation reference signal bundling for the indicated at least one of the first uplink shared channel message or the second uplink shared channel message. In some examples, to support performing the cancellation operation, the uplink message manager 1135 may be configured as or otherwise support a means for transmitting the first and second uplink shared channel messages to the base station, the first and second uplink shared channel messages interleaved.

In some examples, to support performing the cancellation operation, the capability message manager 1125 may be configured as or otherwise support a means for transmitting, to the base station, a message than indicates that the UE is incapable of both interleaving the first and second uplink shared channel messages and enabling demodulation reference signal bundling.

Figure 12:
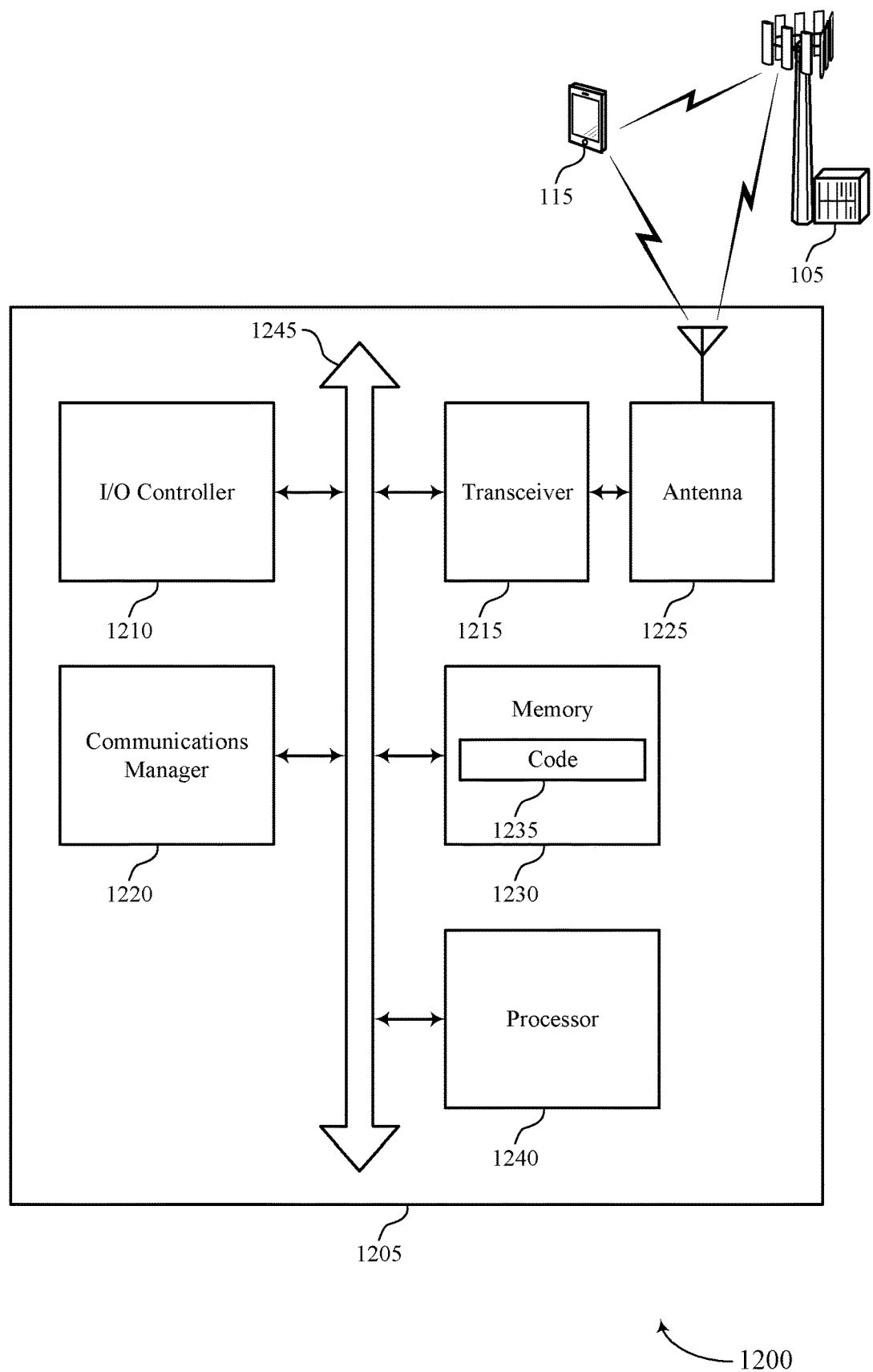
FIG. 12 shows a diagram of a system including a device that supports interleaved PUSCH transmissions in accordance with aspects of the present disclosure.

FIG. 12 shows a diagram of a system 1200 including a device 1205 that supports interleaved PUSCH transmissions in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting interleaved PUSCH transmissions). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for transmitting, to a base station, a message indicating a capability of the UE to support interleaving two or more uplink shared channel messages. The communications manager 1220 may be configured as or otherwise support a means for receiving, from the base station, a first control message that schedules a first uplink shared channel message. The communications manager 1220 may be configured as or otherwise support a means for receiving, from the base station and based on the capability of the UE, a second control message that schedules a second uplink shared channel message, where a duration associated with the second uplink shared channel message at least partially overlaps with a duration associated with the first uplink shared channel message. The communications manager 1220 may be configured as or otherwise support a means for transmitting the first and second uplink shared channel messages to the base station, the first and second uplink shared channel messages interleaved based on the capability of the UE.

Additionally or alternatively, the communications manager 1220 may support wireless communications at a UE in accordance with examples as disclosed herein. For example, the communications manager 1220 may be configured as or otherwise support a means for receiving, from a base station, a first control message that schedules a first uplink shared channel message. The communications manager 1220 may be configured as or otherwise support a means for receiving, from the base station, a second control message that schedules a second uplink shared channel message for interleaving with the first uplink shared channel message. The communications manager 1220 may be configured as or otherwise support a means for receiving an indication that demodulation reference signal bundling is enabled for at least one of the first uplink shared channel message or the second uplink shared channel message. The communications manager 1220 may be configured as or otherwise support a means for performing a cancellation operation based on the indication that reference signal bundling is enabled.

By including or configuring the communications manager 1220 in accordance with examples as described herein, the device 1205 may support techniques for reduced latency and more efficient utilization of communication resources by interleaving uplink shared channel transmissions and simultaneously buffering payloads associated with the interleaved uplink shared channel transmissions.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of interleaved PUSCH transmissions as described herein, or the processor 1240 and the memory 1230 may be otherwise configured to perform or support such operations.

Figure 13:
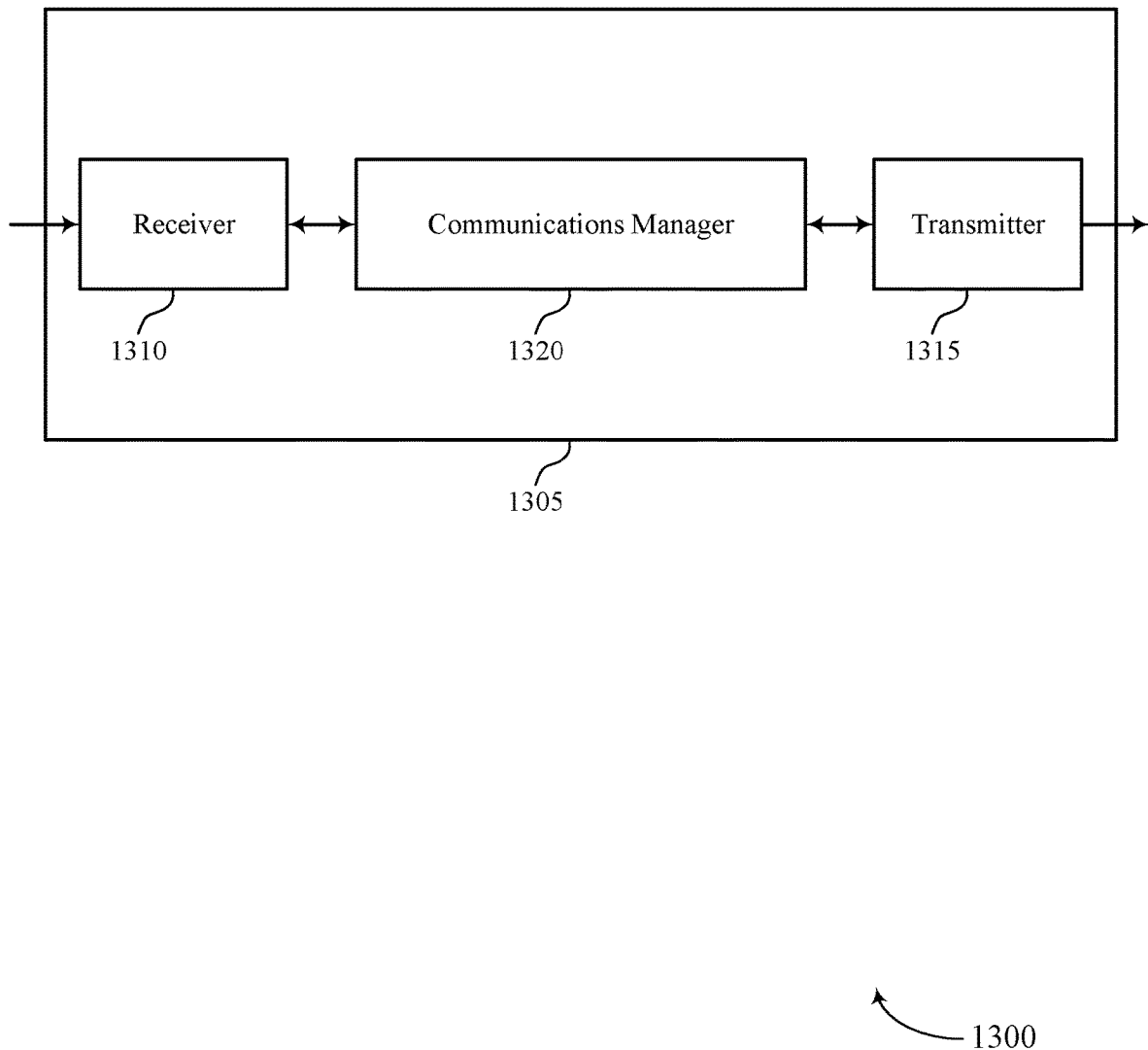
FIGS. 13 and 14 show block diagrams of devices that support interleaved PUSCH transmissions in accordance with aspects of the present disclosure.

FIG. 13 shows a block diagram 1300 of a device 1305 that supports interleaved PUSCH transmissions in accordance with aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to interleaved PUSCH transmissions). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to interleaved PUSCH transmissions). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of interleaved PUSCH transmissions as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. For example, the communications manager 1320 may be configured as or otherwise support a means for receiving, from a UE, a message indicating a capability of the UE to support interleaving two or more uplink shared channel messages. The communications manager 1320 may be configured as or otherwise support a means for transmitting, to the UE, a first control message that schedules a first uplink shared channel message based on the capability of the UE. The communications manager 1320 may be configured as or otherwise support a means for transmitting, to the UE, a second control message that schedules a second uplink shared channel message based on the capability of the UE, where a duration associated with the second uplink shared channel message at least partially overlaps a duration associated with the first uplink shared channel message in time. The communications manager 1320 may be configured as or otherwise support a means for receiving, from the UE, the first and second uplink shared channel messages interleaved based on the capability of the UE.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for more efficient utilization of communication resources by scheduling and then receiving by interleaved uplink shared channel transmissions.

Figure 14:
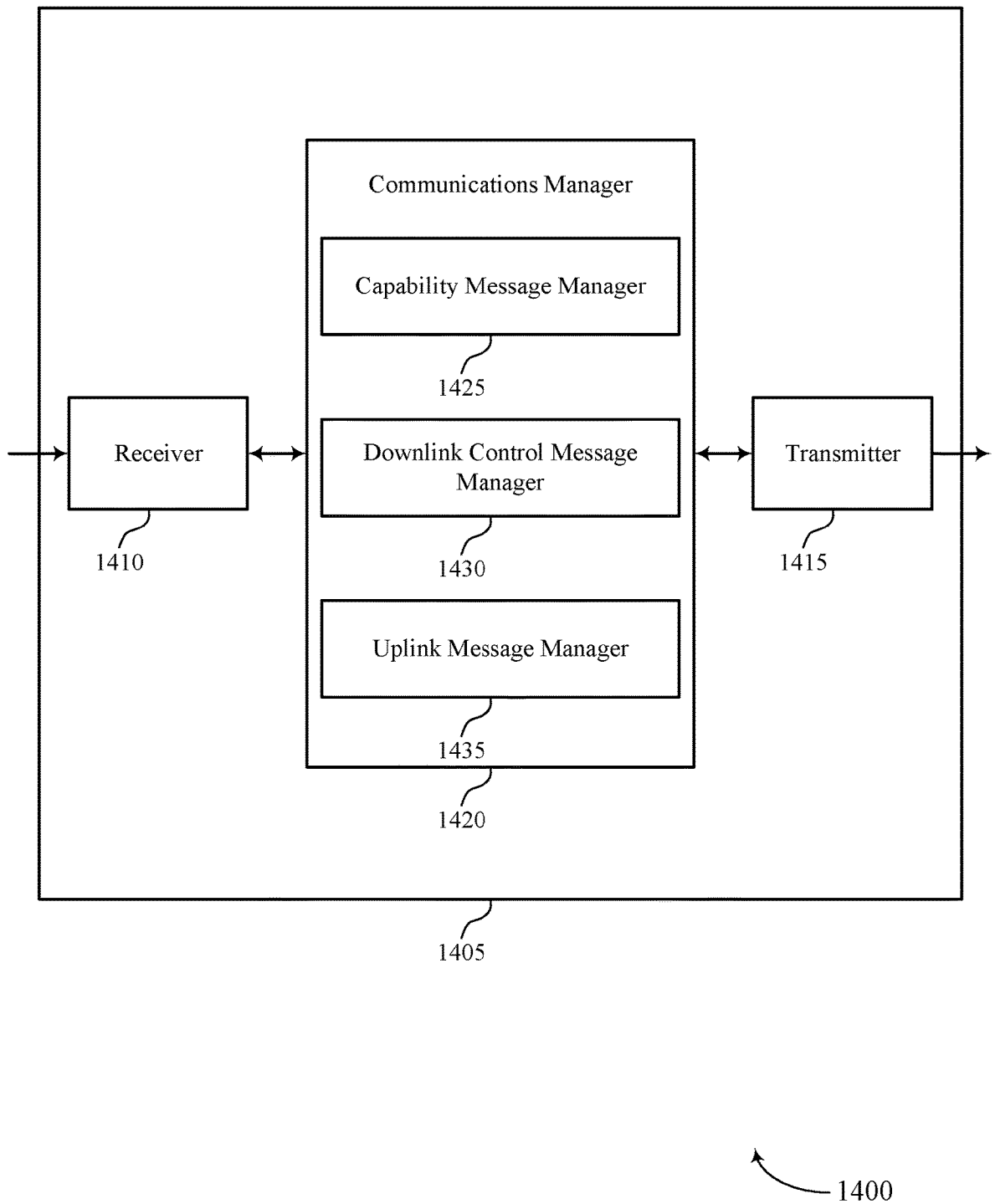

FIG. 14 shows a block diagram 1400 of a device 1405 that supports interleaved PUSCH transmissions in accordance with aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to interleaved PUSCH transmissions). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to interleaved PUSCH transmissions). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of interleaved PUSCH transmissions as described herein. For example, the communications manager 1420 may include a capability message manager 1425, a downlink control message manager 1430, an uplink message manager 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. The capability message manager 1425 may be configured as or otherwise support a means for receiving, from a UE, a message indicating a capability of the UE to support interleaving two or more uplink shared channel messages. The downlink control message manager 1430 may be configured as or otherwise support a means for transmitting, to the UE, a first control message that schedules a first uplink shared channel message based on the capability of the UE. The downlink control message manager 1430 may be configured as or otherwise support a means for transmitting, to the UE, a second control message that schedules a second uplink shared channel message based on the capability of the UE, where a duration associated with the second uplink shared channel message at least partially overlaps a duration associated with the first uplink shared channel message in time. The uplink message manager 1435 may be configured as or otherwise support a means for receiving, from the UE, the first and second uplink shared channel messages interleaved based on the capability of the UE.

Figure 15:
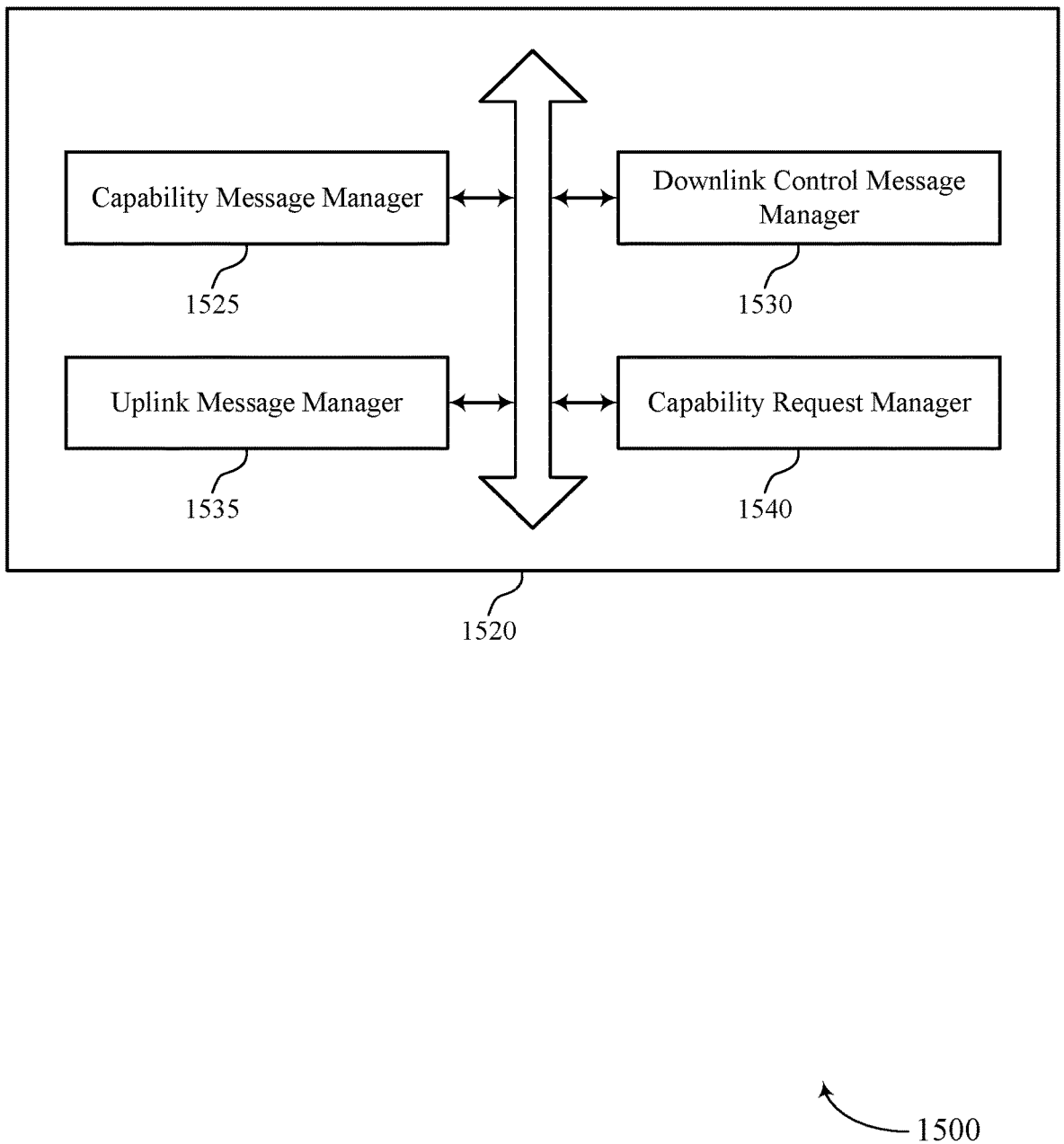
FIG. 15 shows a block diagram of a communications manager that supports interleaved PUSCH transmissions in accordance with aspects of the present disclosure.

FIG. 15 shows a block diagram 1500 of a communications manager 1520 that supports interleaved PUSCH transmissions in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of interleaved PUSCH transmissions as described herein. For example, the communications manager 1520 may include a capability message manager 1525, a downlink control message manager 1530, an uplink message manager 1535, a capability request manager 1540, or any combination thereof. Each of these components may communicate, directly or indirectly, with one another (e.g., via one or more buses).

The communications manager 1520 may support wireless communications at a base station in accordance with examples as disclosed herein. The capability message manager 1525 may be configured as or otherwise support a means for receiving, from a UE, a message indicating a capability of the UE to support interleaving two or more uplink shared channel messages. The downlink control message manager 1530 may be configured as or otherwise support a means for transmitting, to the UE, a first control message that schedules a first uplink shared channel message based on the capability of the UE. In some examples, the downlink control message manager 1530 may be configured as or otherwise support a means for transmitting, to the UE, a second control message that schedules a second uplink shared channel message based on the capability of the UE, where a duration associated with the second uplink shared channel message at least partially overlaps a duration associated with the first uplink shared channel message in time. The uplink message manager 1535 may be configured as or otherwise support a means for receiving, from the UE, the first and second uplink shared channel messages interleaved based on the capability of the UE.

In some examples, the capability message manager 1525 may be configured as or otherwise support a means for receiving, from the UE, a second message indicating a total number of interleaved uplink shared channel messages the UE is capable of supporting per component carrier associated with the UE.

In some examples, the capability message manager 1525 may be configured as or otherwise support a means for receiving, from the UE, a second message indicating a total number of interleaved uplink shared channel messages the UE is capable of supporting across all component carriers associated with the UE.

In some examples, the capability request manager 1540 may be configured as or otherwise support a means for transmitting, to the UE, a request for an indication of the capability of the UE to support transmitting two or more uplink shared channel messages that are interleaved in time.

In some examples, transmitting the first control message includes transmitting a first dynamic grant, the first dynamic grant scheduling the first uplink shared channel message. In some examples, transmitting the second control message includes transmitting a second dynamic grant, the second dynamic grant scheduling the second uplink shared channel message.

In some examples, transmitting the first control message includes transmitting a first configured grant, the first configured grant scheduling the first uplink shared channel message. In some examples, transmitting the second control message includes transmitting a second configured grant, the second configured grant scheduling the second uplink shared channel message.

In some examples, transmitting the first control message includes transmitting a configured grant, the configured grant scheduling the first uplink shared channel message. In some examples, transmitting the second control message includes transmitting a dynamic grant, the dynamic grant scheduling the second uplink shared channel message.

In some examples, the first uplink shared channel message is a type-1 uplink shared channel message and the second uplink shared channel message is a type-2 uplink shared channel message.

Figure 16:
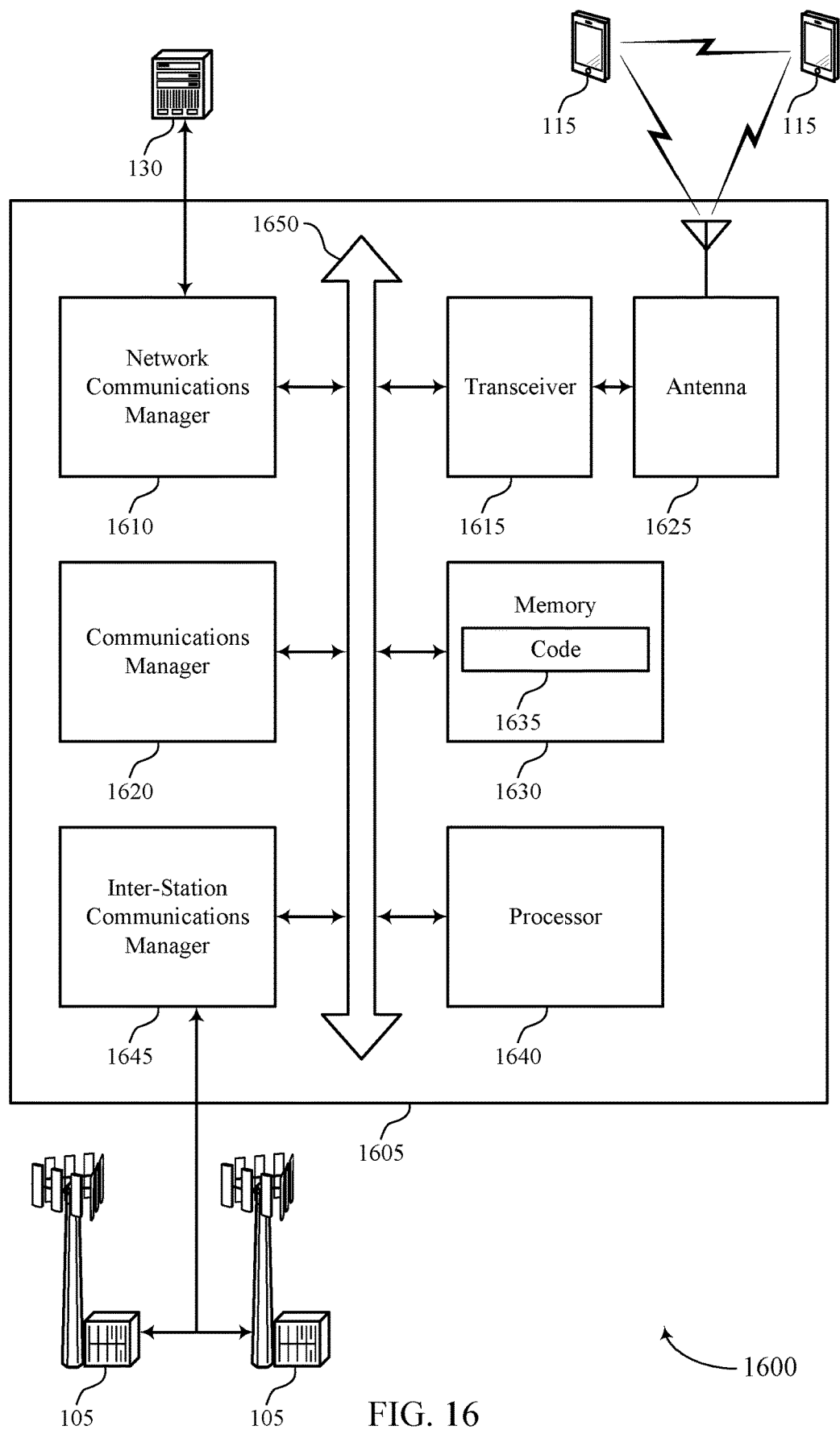
FIG. 16 shows a diagram of a system including a device that supports interleaved PUSCH transmissions in accordance with aspects of the present disclosure.

FIG. 16 shows a diagram of a system 1600 including a device 1605 that supports interleaved PUSCH transmissions in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting interleaved PUSCH transmissions). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communications at a base station in accordance with examples as disclosed herein. For example, the communications manager 1620 may be configured as or otherwise support a means for receiving, from a UE, a message indicating a capability of the UE to support interleaving two or more uplink shared channel messages. The communications manager 1620 may be configured as or otherwise support a means for transmitting, to the UE, a first control message that schedules a first uplink shared channel message based on the capability of the UE. The communications manager 1620 may be configured as or otherwise support a means for transmitting, to the UE, a second control message that schedules a second uplink shared channel message based on the capability of the UE, where a duration associated with the second uplink shared channel message at least partially overlaps a duration associated with the first uplink shared channel message in time. The communications manager 1620 may be configured as or otherwise support a means for receiving, from the UE, the first and second uplink shared channel messages interleaved based on the capability of the UE.

By including or configuring the communications manager 1620 in accordance with examples as described herein, the device 1605 may support techniques for reduced latency and efficient utilization of communication resources by scheduling and then receiving by interleaved uplink shared channel transmissions.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of interleaved PUSCH transmissions as described herein, or the processor 1640 and the memory 1630 may be otherwise configured to perform or support such operations.

Figure 17:
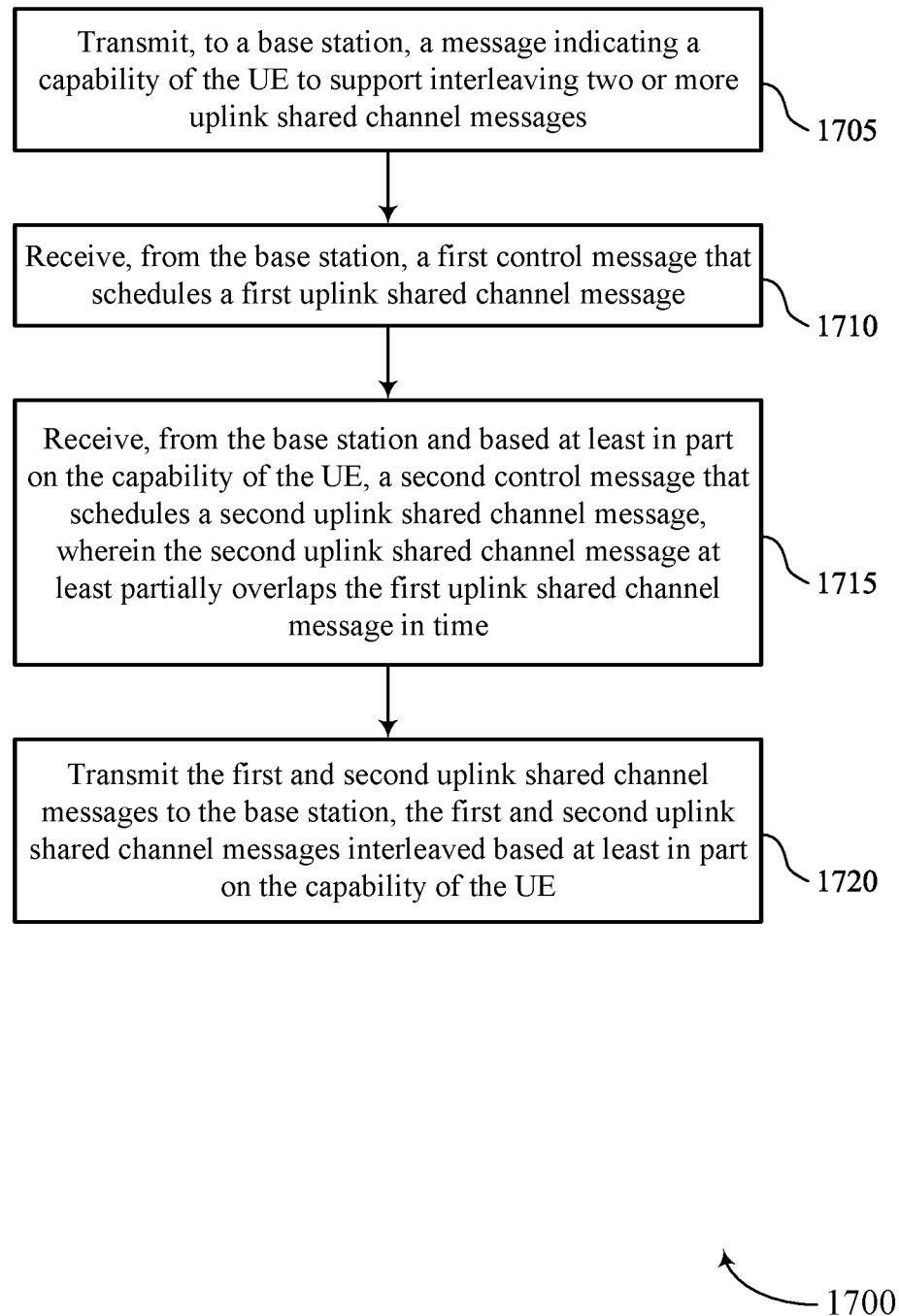
FIGS. 17 through 26 show flowcharts illustrating methods that support interleaved PUSCH transmissions in accordance with aspects of the present disclosure.

FIG. 17 shows a flowchart illustrating a method 1700 that supports interleaved PUSCH transmissions in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include transmitting, to a base station, a message indicating a capability of the UE to support interleaving two or more uplink shared channel messages. The operations of 1705 may be performed in accordance with examples as disclosed herein. In some examples, aspects of the operations of 1705 may be performed by a capability message manager 1125 as described with reference to FIG. 11.

At 1710, the method may include receiving, from the base station, a first control message that schedules a first uplink shared channel message. The operations of 1710 may be performed in accordance with examples as disclosed herein. In some examples, aspects of the operations of 1710 may be performed by a downlink control message manager 1130 as described with reference to FIG. 11.

At 1715, the method may include receiving, from the base station and based on the capability of the UE, a second control message that schedules a second uplink shared channel message, where a duration associated with the second uplink shared channel message at least partially overlaps with a duration associated with the first uplink shared channel message. The operations of 1715 may be performed in accordance with examples as disclosed herein. In some examples, aspects of the operations of 1715 may be performed by a downlink control message manager 1130 as described with reference to FIG. 11.

At 1720, the method may include transmitting the first and second uplink shared channel messages to the base station, the first and second uplink shared channel messages interleaved based on the capability of the UE. The operations of 1720 may be performed in accordance with examples as disclosed herein. In some examples, aspects of the operations of 1720 may be performed by an uplink message manager 1135 as described with reference to FIG. 11.

Figure 18:
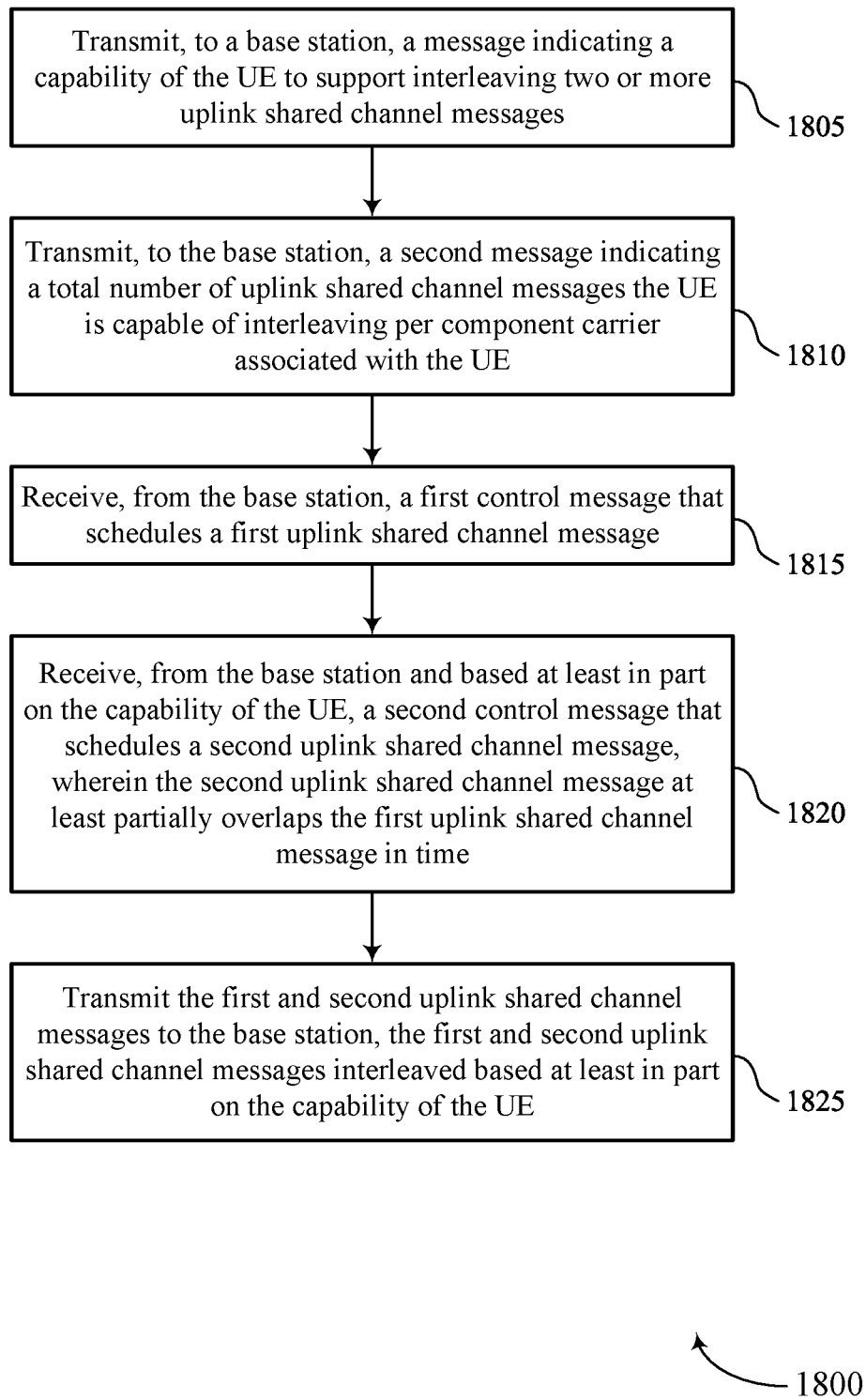

FIG. 18 shows a flowchart illustrating a method 1800 that supports interleaved PUSCH transmissions in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include transmitting, to a base station, a message indicating a capability of the UE to support interleaving two or more uplink shared channel messages. The operations of 1805 may be performed in accordance with examples as disclosed herein. In some examples, aspects of the operations of 1805 may be performed by a capability message manager 1125 as described with reference to FIG. 11.

At 1810, the method may include transmitting, to the base station, a second message indicating a total number of interleaved uplink shared channel messages the UE is capable of supporting per component carrier associated with the UE. The operations of 1810 may be performed in accordance with examples as disclosed herein. In some examples, aspects of the operations of 1810 may be performed by a capability message manager 1125 as described with reference to FIG. 11.

At 1815, the method may include receiving, from the base station, a first control message that schedules a first uplink shared channel message. The operations of 1815 may be performed in accordance with examples as disclosed herein. In some examples, aspects of the operations of 1815 may be performed by a downlink control message manager 1130 as described with reference to FIG. 11.

At 1820, the method may include receiving, from the base station and based on the capability of the UE, a second control message that schedules a second uplink shared channel message, where a duration associated with the second uplink shared channel message at least partially overlaps with a duration associated with the first uplink shared channel message. The operations of 1820 may be performed in accordance with examples as disclosed herein. In some examples, aspects of the operations of 1820 may be performed by a downlink control message manager 1130 as described with reference to FIG. 11.

At 1825, the method may include transmitting the first and second uplink shared channel messages to the base station, the first and second uplink shared channel messages interleaved based on the capability of the UE. The operations of 1825 may be performed in accordance with examples as disclosed herein. In some examples, aspects of the operations of 1825 may be performed by an uplink message manager 1135 as described with reference to FIG. 11.

Figure 19:
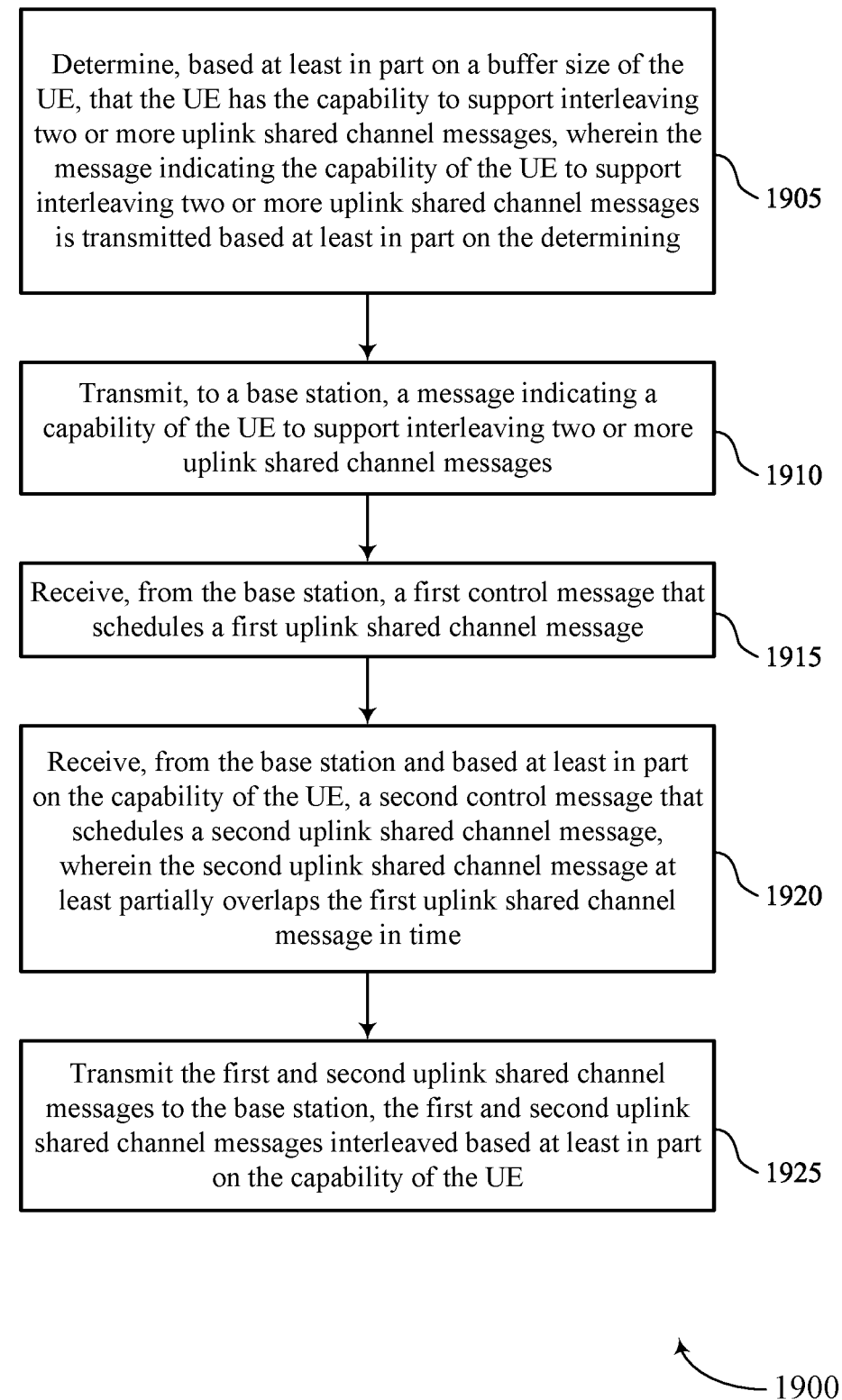

FIG. 19 shows a flowchart illustrating a method 1900 that supports interleaved PUSCH transmissions in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1905, the method may include determining, based on a buffer size of the UE, that the UE has the capability to support transmitting two or more uplink shared channel messages that are interleaved, where the message indicating the capability of the UE to support transmitting two or more uplink shared channel messages that are interleaved is transmitted based on the determining. The operations of 1905 may be performed in accordance with examples as disclosed herein. In some examples, aspects of the operations of 1905 may be performed by a capability manager 1150 as described with reference to FIG. 11.

At 1910, the method may include transmitting, to a base station, a message indicating a capability of the UE to support interleaving two or more uplink shared channel messages. The operations of 1910 may be performed in accordance with examples as disclosed herein. In some examples, aspects of the operations of 1910 may be performed by a capability message manager 1125 as described with reference to FIG. 11.

At 1915, the method may include receiving, from the base station, a first control message that schedules a first uplink shared channel message. The operations of 1915 may be performed in accordance with examples as disclosed herein. In some examples, aspects of the operations of 1915 may be performed by a downlink control message manager 1130 as described with reference to FIG. 11.

At 1920, the method may include receiving, from the base station and based on the capability of the UE, a second control message that schedules a second uplink shared channel message, where a duration associated with the second uplink shared channel message at least partially overlaps with a duration associated with the first uplink shared channel message. The operations of 1920 may be performed in accordance with examples as disclosed herein. In some examples, aspects of the operations of 1920 may be performed by a downlink control message manager 1130 as described with reference to FIG. 11.

At 1925, the method may include transmitting the first and second uplink shared channel messages to the base station, the first and second uplink shared channel messages interleaved based on the capability of the UE. The operations of 1925 may be performed in accordance with examples as disclosed herein. In some examples, aspects of the operations of 1925 may be performed by an uplink message manager 1135 as described with reference to FIG. 11.

Figure 20:
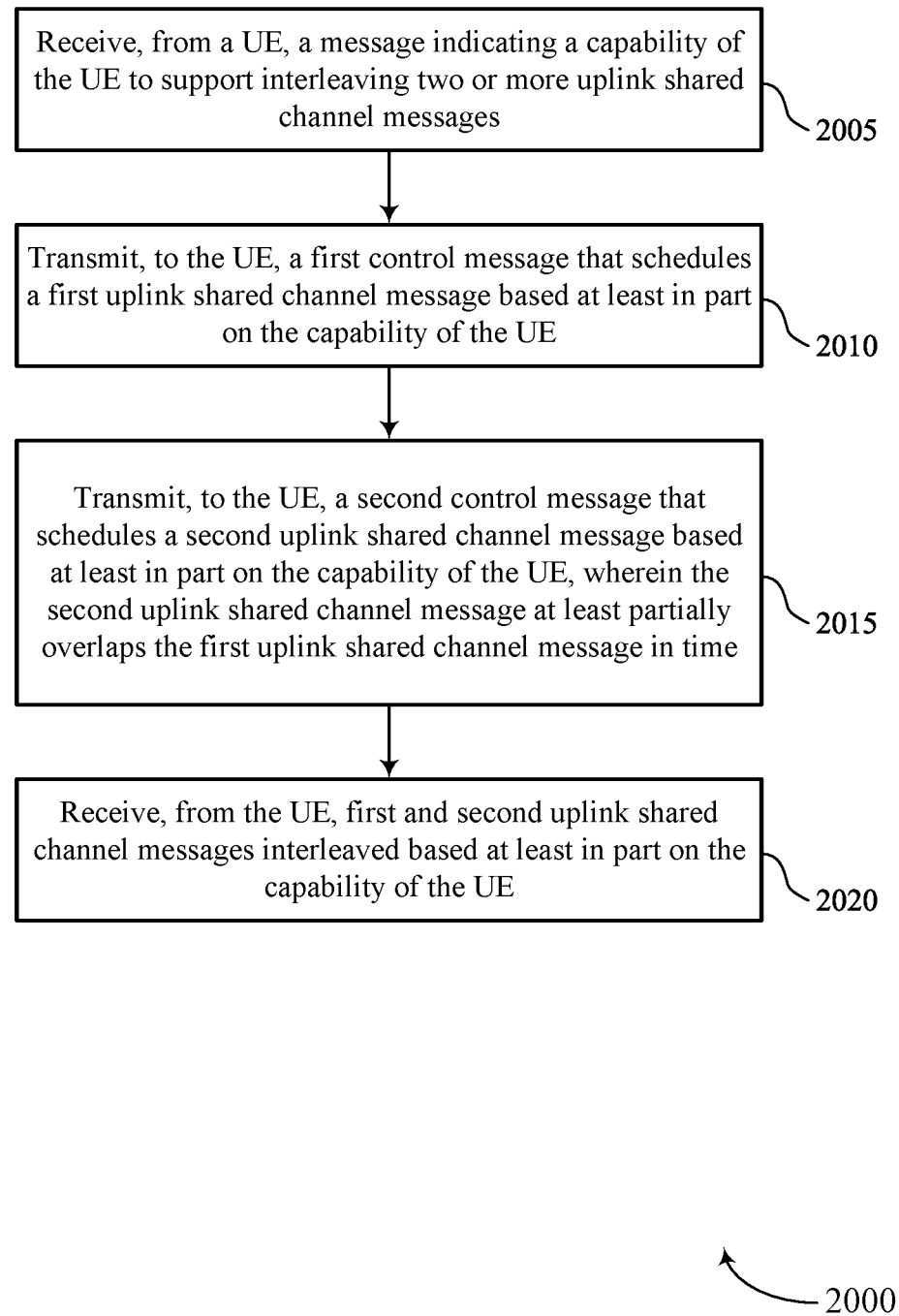

FIG. 20 shows a flowchart illustrating a method 2000 that supports interleaved PUSCH transmissions in accordance with aspects of the present disclosure. The operations of the method 2000 may be implemented by a base station or its components as described herein. For example, the operations of the method 2000 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2005, the method may include receiving, from a UE, a message indicating a capability of the UE to support interleaving two or more uplink shared channel messages. The operations of 2005 may be performed in accordance with examples as disclosed herein. In some examples, aspects of the operations of 2005 may be performed by a capability message manager 1525 as described with reference to FIG. 15.

At 2010, the method may include transmitting, to the UE, a first control message that schedules a first uplink shared channel message based on the capability of the UE. The operations of 2010 may be performed in accordance with examples as disclosed herein. In some examples, aspects of the operations of 2010 may be performed by a downlink control message manager 1530 as described with reference to FIG. 15.

At 2015, the method may include transmitting, to the UE, a second control message that schedules a second uplink shared channel message based on the capability of the UE, where a duration associated with the second uplink shared channel message at least partially overlaps a duration associated with the first uplink shared channel message in time. The operations of 2015 may be performed in accordance with examples as disclosed herein. In some examples, aspects of the operations of 2015 may be performed by a downlink control message manager 1530 as described with reference to FIG. 15.

At 2020, the method may include receiving, from the UE, the first and second uplink shared channel messages interleaved based on the capability of the UE. The operations of 2020 may be performed in accordance with examples as disclosed herein. In some examples, aspects of the operations of 2020 may be performed by an uplink message manager 1535 as described with reference to FIG. 15.

Figure 21:
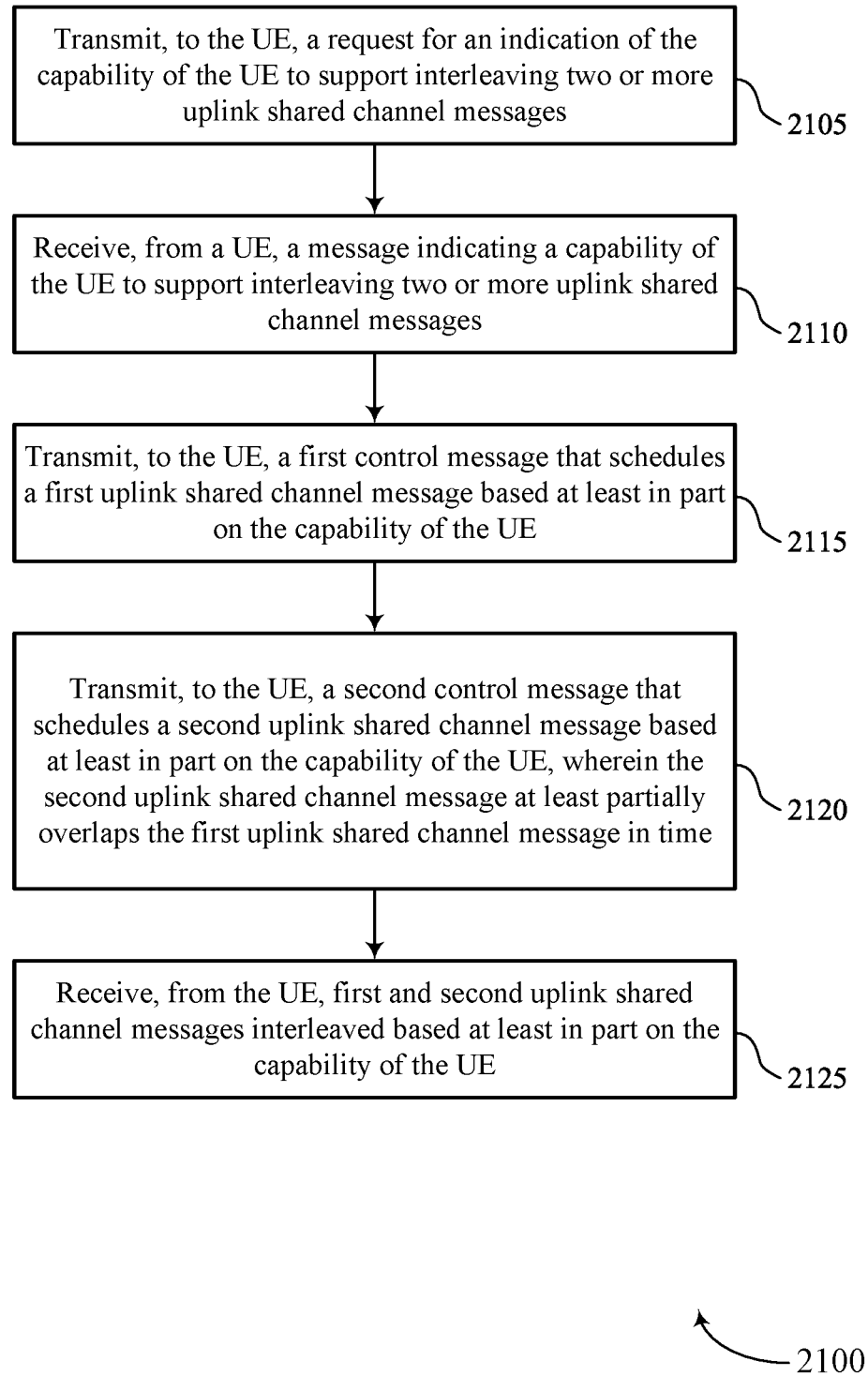

FIG. 21 shows a flowchart illustrating a method 2100 that supports interleaved PUSCH transmissions in accordance with aspects of the present disclosure. The operations of the method 2100 may be implemented by a base station or its components as described herein. For example, the operations of the method 2100 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2105, the method may include transmitting, to the UE, a request for an indication of the capability of the UE to support transmitting two or more uplink shared channel messages that are interleaved in time. The operations of 2105 may be performed in accordance with examples as disclosed herein. In some examples, aspects of the operations of 2105 may be performed by a capability request manager 1540 as described with reference to FIG. 15.

At 2110, the method may include receiving, from a UE, a message indicating a capability of the UE to support interleaving two or more uplink shared channel messages. The operations of 2110 may be performed in accordance with examples as disclosed herein. In some examples, aspects of the operations of 2110 may be performed by a capability message manager 1525 as described with reference to FIG. 15.

At 2115, the method may include transmitting, to the UE, a first control message that schedules a first uplink shared channel message based on the capability of the UE. The operations of 2115 may be performed in accordance with examples as disclosed herein. In some examples, aspects of the operations of 2115 may be performed by a downlink control message manager 1530 as described with reference to FIG. 15.

At 2120, the method may include transmitting, to the UE, a second control message that schedules a second uplink shared channel message based on the capability of the UE, where a duration associated with the second uplink shared channel message at least partially overlaps a duration associated with the first uplink shared channel message in time. The operations of 2120 may be performed in accordance with examples as disclosed herein. In some examples, aspects of the operations of 2120 may be performed by a downlink control message manager 1530 as described with reference to FIG. 15.

At 2125, the method may include receiving, from the UE, the first and second uplink shared channel messages interleaved based on the capability of the UE. The operations of 2125 may be performed in accordance with examples as disclosed herein. In some examples, aspects of the operations of 2125 may be performed by an uplink message manager 1535 as described with reference to FIG. 15.

Figure 22:
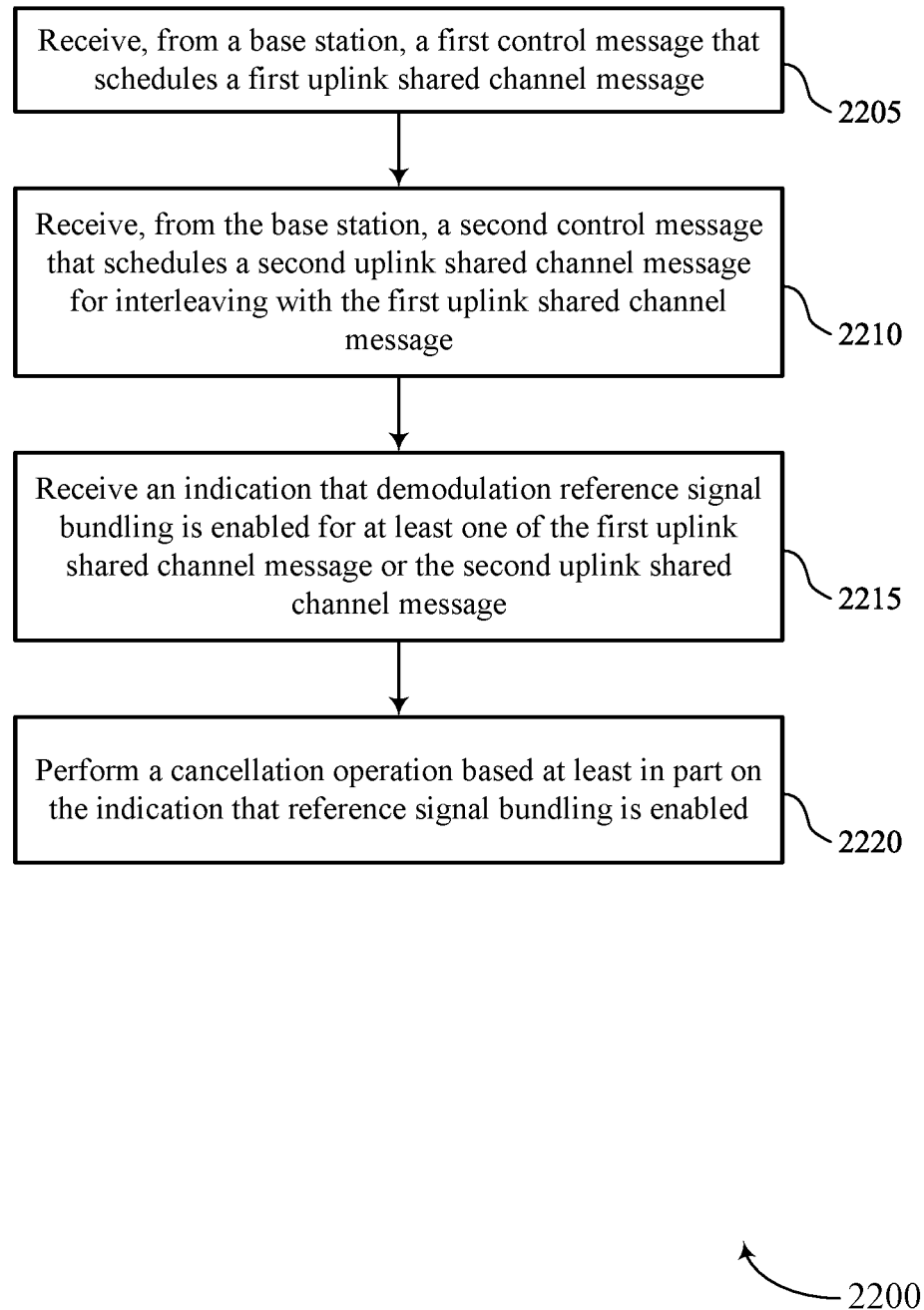

FIG. 22 shows a flowchart illustrating a method 2200 that supports interleaved PUSCH transmissions in accordance with aspects of the present disclosure. The operations of the method 2200 may be implemented by a UE or its components as described herein. For example, the operations of the method 2200 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2205, the method may include receiving, from a base station, a first control message that schedules a first uplink shared channel message. The operations of 2205 may be performed in accordance with examples as disclosed herein. In some examples, aspects of the operations of 2205 may be performed by a downlink control message manager 1130 as described with reference to FIG. 11.

At 2210, the method may include receiving, from the base station, a second control message that schedules a second uplink shared channel message for interleaving with the first uplink shared channel message. The operations of 2210 may be performed in accordance with examples as disclosed herein. In some examples, aspects of the operations of 2210 may be performed by a downlink control message manager 1130 as described with reference to FIG. 11.

At 2215, the method may include receiving an indication that demodulation reference signal bundling is enabled for at least one of the first uplink shared channel message or the second uplink shared channel message. The operations of 2215 may be performed in accordance with examples as disclosed herein. In some examples, aspects of the operations of 2215 may be performed by a bundling manager 1140 as described with reference to FIG. 11.

At 2220, the method may include performing a cancellation operation based on the indication that reference signal bundling is enabled. The operations of 2220 may be performed in accordance with examples as disclosed herein. In some examples, aspects of the operations of 2220 may be performed by an uplink message manager 1135 as described with reference to FIG. 11.

Figure 23:
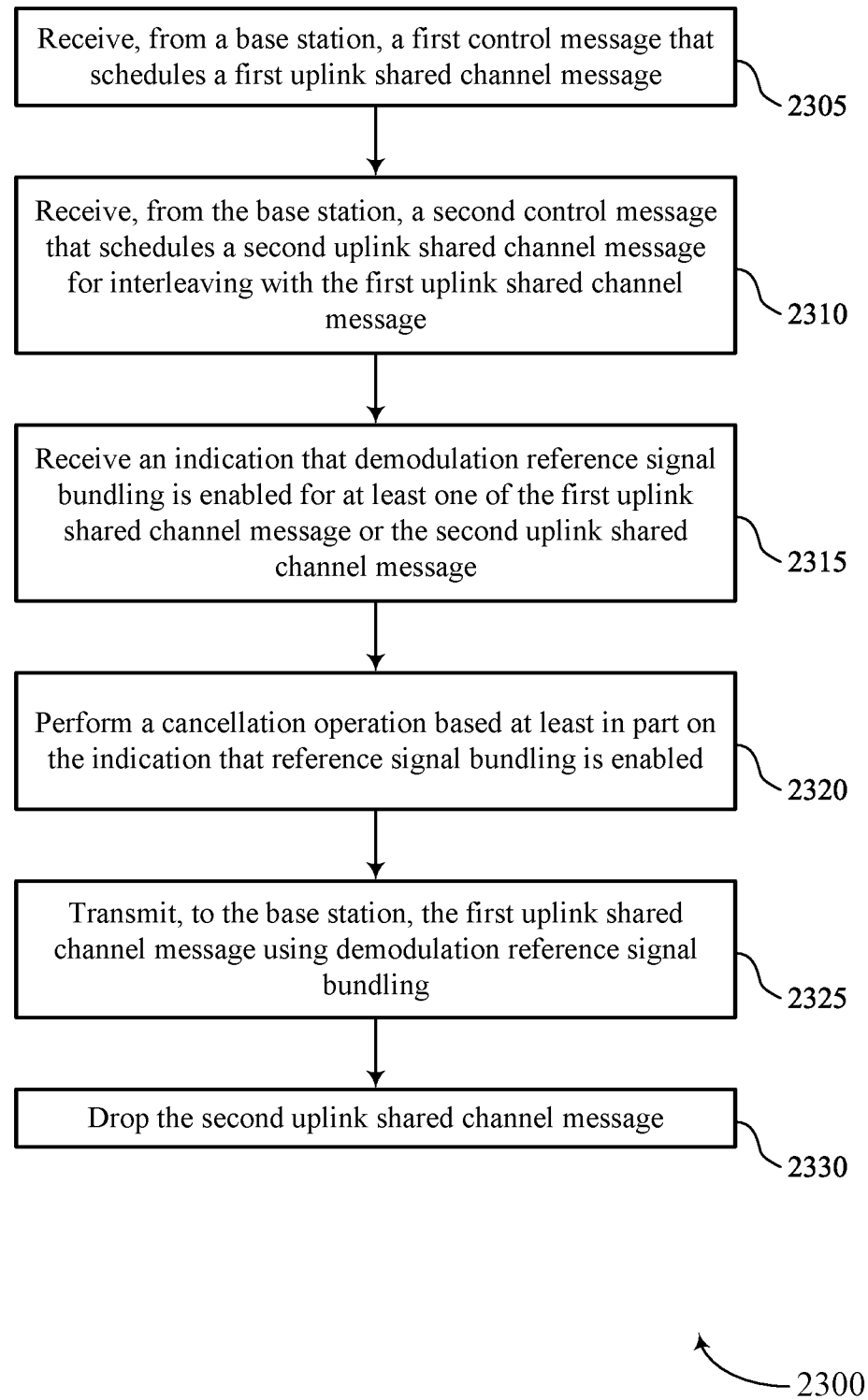

FIG. 23 shows a flowchart illustrating a method 2300 that supports interleaved PUSCH transmissions in accordance with aspects of the present disclosure. The operations of the method 2300 may be implemented by a UE or its components as described herein. For example, the operations of the method 2300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2305, the method may include receiving, from a base station, a first control message that schedules a first uplink shared channel message. The operations of 2305 may be performed in accordance with examples as disclosed herein. In some examples, aspects of the operations of 2305 may be performed by a downlink control message manager 1130 as described with reference to FIG. 11.

At 2310, the method may include receiving, from the base station, a second control message that schedules a second uplink shared channel message for interleaving with the first uplink shared channel message. The operations of 2310 may be performed in accordance with examples as disclosed herein. In some examples, aspects of the operations of 2310 may be performed by a downlink control message manager 1130 as described with reference to FIG. 11.

At 2315, the method may include receiving an indication that demodulation reference signal bundling is enabled for at least one of the first uplink shared channel message or the second uplink shared channel message. The operations of 2315 may be performed in accordance with examples as disclosed herein. In some examples, aspects of the operations of 2315 may be performed by a bundling manager 1140 as described with reference to FIG. 11.

At 2320, the method may include performing a cancellation operation based on the indication that reference signal bundling is enabled. The operations of 2320 may be performed in accordance with examples as disclosed herein. In some examples, aspects of the operations of 2320 may be performed by an uplink message manager 1135 as described with reference to FIG. 11.

At 2325, the method may include transmitting, to the base station, the first uplink shared channel message using demodulation reference signal bundling. The operations of 2325 may be performed in accordance with examples as disclosed herein. In some examples, aspects of the operations of 2325 may be performed by an uplink message buffer 1155 as described with reference to FIG. 11.

At 2330, the method may include dropping the second uplink shared channel message. The operations of 2330 may be performed in accordance with examples as disclosed herein. In some examples, aspects of the operations of 2330 may be performed by an uplink message manager 1135 as described with reference to FIG. 11.

Figure 24:
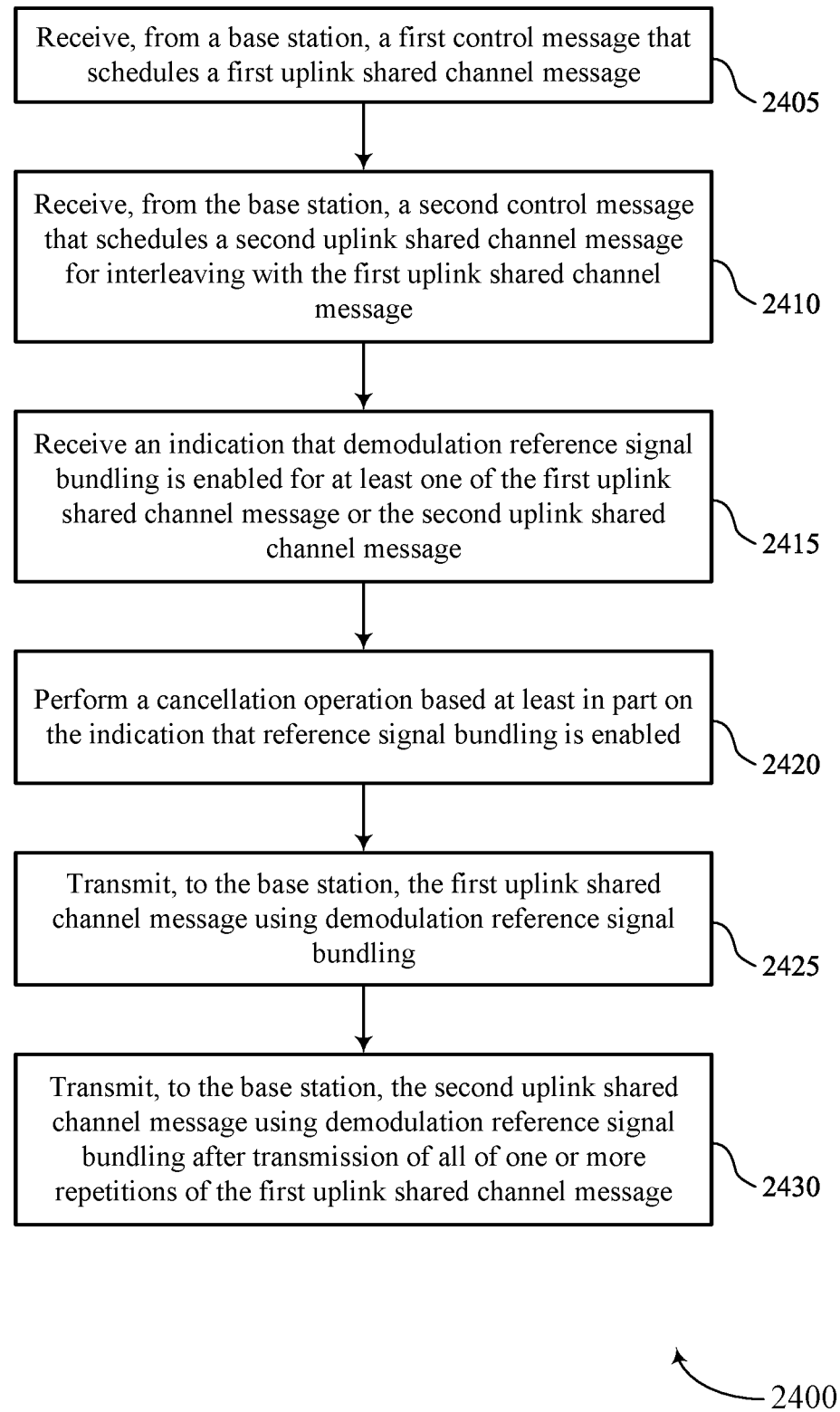

FIG. 24 shows a flowchart illustrating a method 2400 that supports interleaved PUSCH transmissions in accordance with aspects of the present disclosure. The operations of the method 2400 may be implemented by a UE or its components as described herein. For example, the operations of the method 2400 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2405, the method may include receiving, from a base station, a first control message that schedules a first uplink shared channel message. The operations of 2405 may be performed in accordance with examples as disclosed herein. In some examples, aspects of the operations of 2405 may be performed by a downlink control message manager 1130 as described with reference to FIG. 11.

At 2410, the method may include receiving, from the base station, a second control message that schedules a second uplink shared channel message for interleaving with the first uplink shared channel message. The operations of 2410 may be performed in accordance with examples as disclosed herein. In some examples, aspects of the operations of 2410 may be performed by a downlink control message manager 1130 as described with reference to FIG. 11.

At 2415, the method may include receiving an indication that demodulation reference signal bundling is enabled for at least one of the first uplink shared channel message or the second uplink shared channel message. The operations of 2415 may be performed in accordance with examples as disclosed herein. In some examples, aspects of the operations of 2415 may be performed by a bundling manager 1140 as described with reference to FIG. 11.

At 2420, the method may include performing a cancellation operation based on the indication that reference signal bundling is enabled. The operations of 2420 may be performed in accordance with examples as disclosed herein. In some examples, aspects of the operations of 2420 may be performed by an uplink message manager 1135 as described with reference to FIG. 11.

At 2425, the method may include transmitting, to the base station, the first uplink shared channel message using demodulation reference signal bundling. The operations of 2425 may be performed in accordance with examples as disclosed herein. In some examples, aspects of the operations of 2425 may be performed by an uplink message manager 1135 as described with reference to FIG. 11.

At 2430, the method may include transmitting, to the base station, the second uplink shared channel message using demodulation reference signal bundling after transmission of all of one or more repetitions of the first uplink shared channel message. The operations of 2430 may be performed in accordance with examples as disclosed herein. In some examples, aspects of the operations of 2430 may be performed by an uplink message manager 1135 as described with reference to FIG. 11.

Figure 25:
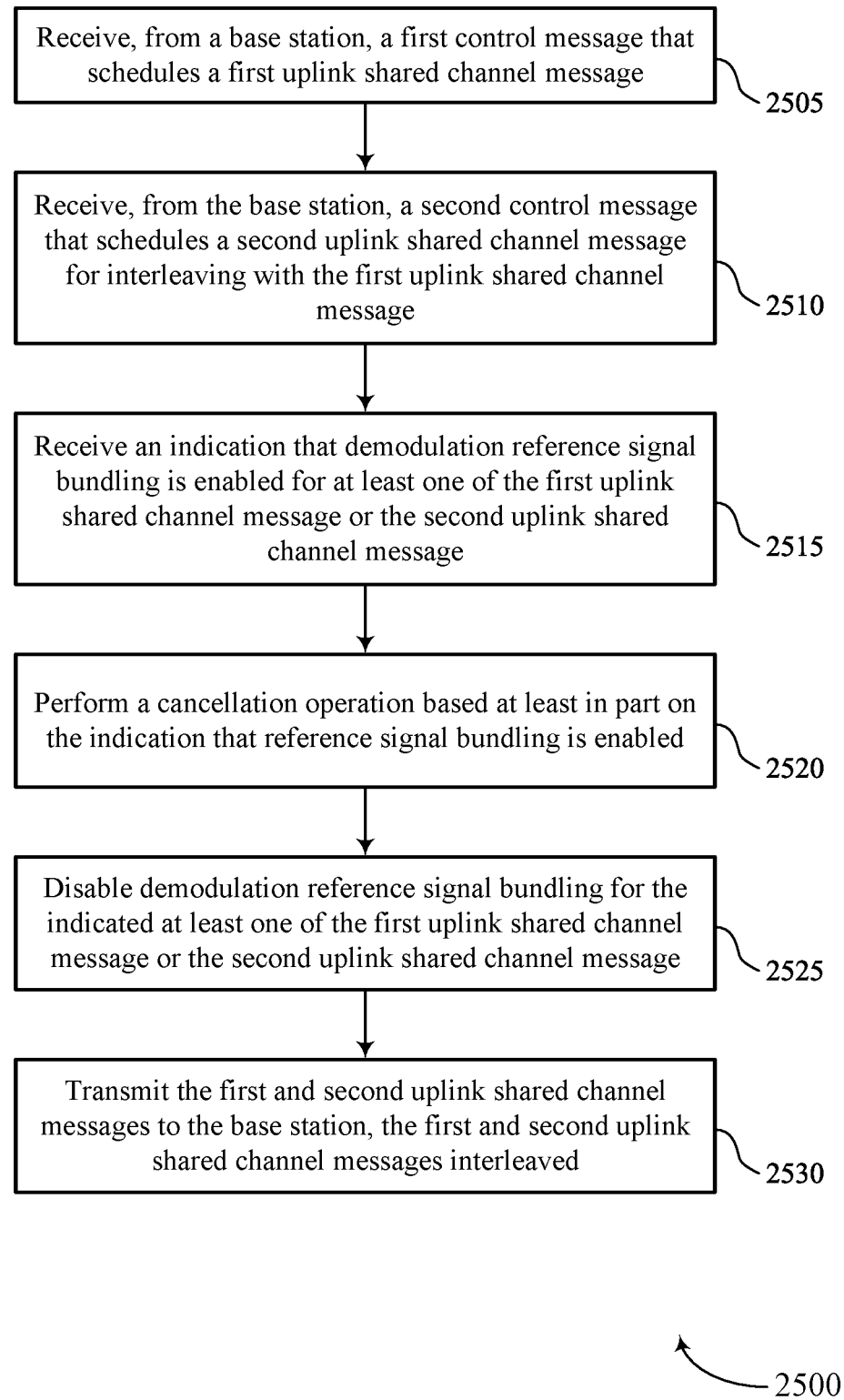

FIG. 25 shows a flowchart illustrating a method 2500 that supports interleaved PUSCH transmissions in accordance with aspects of the present disclosure. The operations of the method 2500 may be implemented by a UE or its components as described herein. For example, the operations of the method 2500 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2505, the method may include receiving, from a base station, a first control message that schedules a first uplink shared channel message. The operations of 2505 may be performed in accordance with examples as disclosed herein. In some examples, aspects of the operations of 2505 may be performed by a downlink control message manager 1130 as described with reference to FIG. 11.

At 2510, the method may include receiving, from the base station, a second control message that schedules a second uplink shared channel message for interleaving with the first uplink shared channel message. The operations of 2510 may be performed in accordance with examples as disclosed herein. In some examples, aspects of the operations of 2510 may be performed by a downlink control message manager 1130 as described with reference to FIG. 11.

At 2515, the method may include receiving an indication that demodulation reference signal bundling is enabled for at least one of the first uplink shared channel message or the second uplink shared channel message. The operations of 2515 may be performed in accordance with examples as disclosed herein. In some examples, aspects of the operations of 2515 may be performed by a bundling manager 1140 as described with reference to FIG. 11.

At 2520, the method may include performing a cancellation operation based on the indication that reference signal bundling is enabled. The operations of 2520 may be performed in accordance with examples as disclosed herein. In some examples, aspects of the operations of 2520 may be performed by an uplink message manager 1135 as described with reference to FIG. 11.

At 2525, the method may include disabling demodulation reference signal bundling for the indicated at least one of the first uplink shared channel message or the second uplink shared channel message. The operations of 2525 may be performed in accordance with examples as disclosed herein. In some examples, aspects of the operations of 2525 may be performed by a bundling manager 1140 as described with reference to FIG. 11.

At 2530, the method may include transmitting the first and second uplink shared channel messages to the base station, the first and second uplink shared channel messages interleaved. The operations of 2530 may be performed in accordance with examples as disclosed herein. In some examples, aspects of the operations of 2530 may be performed by an uplink message manager 1135 as described with reference to FIG. 11.

Figure 26:
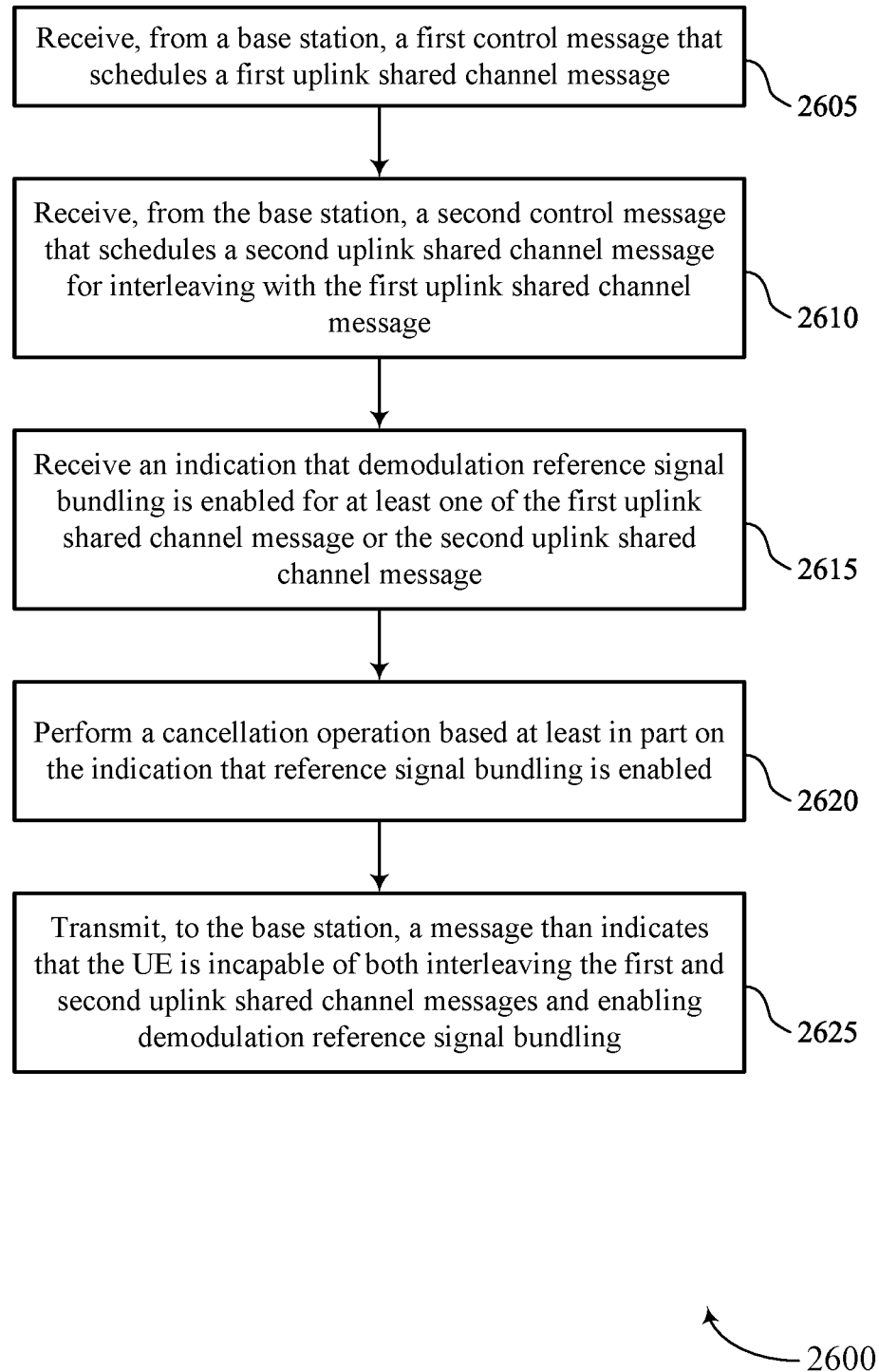

FIG. 26 shows a flowchart illustrating a method 2600 that supports interleaved PUSCH transmissions in accordance with aspects of the present disclosure. The operations of the method 2600 may be implemented by a UE or its components as described herein. For example, the operations of the method 2600 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2605, the method may include receiving, from a base station, a first control message that schedules a first uplink shared channel message. The operations of 2605 may be performed in accordance with examples as disclosed herein. In some examples, aspects of the operations of 2605 may be performed by a downlink control message manager 1130 as described with reference to FIG. 11.

At 2610, the method may include receiving, from the base station, a second control message that schedules a second uplink shared channel message for interleaving with the first uplink shared channel message. The operations of 2610 may be performed in accordance with examples as disclosed herein. In some examples, aspects of the operations of 2610 may be performed by a downlink control message manager 1130 as described with reference to FIG. 11.

At 2615, the method may include receiving an indication that demodulation reference signal bundling is enabled for at least one of the first uplink shared channel message or the second uplink shared channel message. The operations of 2615 may be performed in accordance with examples as disclosed herein. In some examples, aspects of the operations of 2615 may be performed by a bundling manager 1140 as described with reference to FIG. 11.

At 2620, the method may include performing a cancellation operation based on the indication that reference signal bundling is enabled. The operations of 2620 may be performed in accordance with examples as disclosed herein. In some examples, aspects of the operations of 2620 may be performed by an uplink message manager 1135 as described with reference to FIG. 11.

At 2625, the method may include transmitting, to the base station, a message than indicates that the UE is incapable of both interleaving the first and second uplink shared channel messages and enabling demodulation reference signal bundling. The operations of 2625 may be performed in accordance with examples as disclosed herein. In some examples, aspects of the operations of 2625 may be performed by a capability message manager 1125 as described with reference to FIG. 11.

The following provides an overview of aspects of the present disclosure:

Aspect 1: A method for wireless communications at a UE, comprising: transmitting, to a base station, a message indicating a capability of the UE to support interleaving two or more uplink shared channel messages; receiving, from the base station, a first control message that schedules a first uplink shared channel message; receiving, from the base station and based at least in part on the capability of the UE, a second control message that schedules a second uplink shared channel message, wherein a duration associated with the second uplink shared channel message at least partially overlaps with a duration associated with the first uplink shared channel message; and transmitting the first and second uplink shared channel messages to the base station, the first and second uplink shared channel messages interleaved based at least in part on the capability of the UE.

Aspect 2: The method of aspect 1, further comprising: transmitting, to the base station, a second message indicating a total number of interleaved uplink shared channel messages the UE is capable of supporting per component carrier associated with the UE.

Aspect 3: The method of any of aspects 1 through 2, further comprising: transmitting, to the base station, a second message indicating a total number of interleaved uplink shared channel messages the UE is supporting of interleaving across all component carriers associated with the UE.

Aspect 4: The method of any of aspects 1 through 3, further comprising: receiving, from the base station, a request for an indication of the capability of the UE to support transmitting two or more uplink shared channel messages that are interleaved in time.

Aspect 5: The method of any of aspects 1 through 4, wherein receiving the first control message comprises receiving a first dynamic grant, the first dynamic grant scheduling the first uplink shared channel message; and receiving the second control message comprises receiving a second dynamic grant, the second dynamic grant scheduling the second uplink shared channel message.

Aspect 6: The method of any of aspects 1 through 5, wherein receiving the first control message comprises receiving a first configured grant, the first configured grant scheduling the first uplink shared channel message; and receiving the second control message comprises receiving a second configured grant, the second configured grant scheduling the second uplink shared channel message.

Aspect 7: The method of any of aspects 1 through 6, wherein receiving the first control message comprises receiving a configured grant, the configured grant scheduling the first uplink shared channel message; and receiving the second control message comprises receiving a dynamic grant, the dynamic grant scheduling the second uplink shared channel message.

Aspect 8: The method of any of aspects 1 through 7, further comprising: determining, based at least in part on a buffer size of the UE, that the UE has the capability to support transmitting two or more uplink shared channel messages that are interleaved, wherein the message indicating the capability of the UE to support transmitting two or more uplink shared channel messages that are interleaved is transmitted based at least in part on the determining.

Aspect 9: The method of any of aspects 1 through 8, further comprising: buffering a first encoded payload associated with the first uplink shared channel message; and buffering a second encoded payload associated with the second uplink shared channel message.

Aspect 10: The method of aspect 9, further comprising: encoding a first payload associated with the first uplink shared channel message before transmission of the first uplink shared channel message; and encoding a second payload associated with the second uplink shared channel message before transmission of the second uplink shared channel message.

Aspect 11: The method of any of aspects 1 through 10, wherein the first uplink shared channel message is a type-1 uplink shared channel message and the second uplink shared channel message is a type-2 uplink shared channel message.

Aspect 12: A method for wireless communications at a base station, comprising: receiving, from a UE, a message indicating a capability of the UE to support interleaving two or more uplink shared channel messages; transmitting, to the UE, a first control message that schedules a first uplink shared channel message based at least in part on the capability of the UE; transmitting, to the UE, a second control message that schedules a second uplink shared channel message based at least in part on the capability of the UE, wherein a duration associated with the second uplink shared channel message at least partially overlaps a duration associated with the first uplink shared channel message in time; and receiving, from the UE, the first and second uplink shared channel messages interleaved based at least in part on the capability of the UE.

Aspect 13: The method of aspect 12, further comprising: receiving, from the UE, a second message indicating a total number of interleaved uplink shared channel messages the UE is capable of supporting per component carrier associated with the UE.

Aspect 14: The method of any of aspects 12 through 13, further comprising: receiving, from the UE, a second message indicating a total number of interleaved uplink shared channel messages the UE is capable of supporting across all component carriers associated with the UE.

Aspect 15: The method of any of aspects 12 through 14, further comprising: transmitting, to the UE, a request for an indication of the capability of the UE to support transmitting two or more uplink shared channel messages that are interleaved in time.

Aspect 16: The method of any of aspects 12 through 15, wherein transmitting the first control message comprises transmitting a first dynamic grant, the first dynamic grant scheduling the first uplink shared channel message; and transmitting the second control message comprises transmitting a second dynamic grant, the second dynamic grant scheduling the second uplink shared channel message.

Aspect 17: The method of any of aspects 12 through 16, wherein transmitting the first control message comprises transmitting a first configured grant, the first configured grant scheduling the first uplink shared channel message; and transmitting the second control message comprises transmitting a second configured grant, the second configured grant scheduling the second uplink shared channel message.

Aspect 18: The method of any of aspects 12 through 17, wherein transmitting the first control message comprises transmitting a configured grant, the configured grant scheduling the first uplink shared channel message; and transmitting the second control message comprises transmitting a dynamic grant, the dynamic grant scheduling the second uplink shared channel message.

Aspect 19: The method of any of aspects 12 through 18, wherein the first uplink shared channel message is a type-1 uplink shared channel message and the second uplink shared channel message is a type-2 uplink shared channel message.

Aspect 20: A method for wireless communications at a UE, comprising: receiving, from a base station, a first control message that schedules a first uplink shared channel message; receiving, from the base station, a second control message that schedules a second uplink shared channel message for interleaving with the first uplink shared channel message; receiving an indication that demodulation reference signal bundling is enabled for at least one of the first uplink shared channel message or the second uplink shared channel message; and performing a cancellation operation based at least in part on the indication that reference signal bundling is enabled.

Aspect 21: The method of aspect 20, wherein performing the cancellation operation comprises: transmitting, to the base station, the first uplink shared channel message using demodulation reference signal bundling; and dropping the second uplink shared channel message.

Aspect 22: The method of any of aspects 20 through 21, wherein performing the cancellation operation comprises: transmitting, to the base station, the second uplink shared channel message using demodulation reference signal bundling; and dropping the first uplink shared channel message.

Aspect 23: The method of any of aspects 20 through 22, wherein performing the cancellation operation comprises: transmitting, to the base station, the first uplink shared channel message using demodulation reference signal bundling; and transmitting, to the base station, the second uplink shared channel message using demodulation reference signal bundling after transmission of all of one or more repetitions of the first uplink shared channel message.

Aspect 24: The method of any of aspects 20 through 23, wherein performing the cancellation operation comprises: disabling demodulation reference signal bundling for the indicated at least one of the first uplink shared channel message or the second uplink shared channel message; and transmitting the first and second uplink shared channel messages to the base station, the first and second uplink shared channel messages interleaved.

Aspect 25: The method of any of aspects 20 through 24, wherein performing the cancellation operation comprises: transmitting, to the base station, a message than indicates that the UE is incapable of both interleaving the first and second uplink shared channel messages and enabling demodulation reference signal bundling.

Aspect 26: An apparatus for wireless communications at a UE, comprising a processor; memory coupled with the processor; and instructions stored in the memory and executable by the processor to cause the apparatus to perform a method of any of aspects 1 through 11.

Aspect 27: An apparatus for wireless communications at a UE, comprising at least one means for performing a method of any of aspects 1 through 11.

Aspect 28: A non-transitory computer-readable medium storing code for wireless communications at a UE, the code comprising instructions executable by a processor to perform a method of any of aspects 1 through 11.

Aspect 29: An apparatus for wireless communications at a base station, comprising a processor; memory coupled with the processor; and instructions stored in the memory and executable by the processor to cause the apparatus to perform a method of any of aspects 12 through 19.

Aspect 30: An apparatus for wireless communications at a base station, comprising at least one means for performing a method of any of aspects 12 through 19.

Aspect 31: A non-transitory computer-readable medium storing code for wireless communications at a base station, the code comprising instructions executable by a processor to perform a method of any of aspects 12 through 19.

Aspect 32: An apparatus for wireless communications at a UE, comprising a processor; memory coupled with the processor; and instructions stored in the memory and executable by the processor to cause the apparatus to perform a method of any of aspects 20 through 25.

Aspect 33: An apparatus for wireless communications at a UE, comprising at least one means for performing a method of any of aspects 20 through 25.

Aspect 34: A non-transitory computer-readable medium storing code for wireless communications at a UE, the code comprising instructions executable by a processor to perform a method of any of aspects 20 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network device, a first control message that schedules a first uplink shared channel message;
   receiving, from the network device, a second control message that schedules a second uplink shared channel message for interleaving with the first uplink shared channel message;
   receiving an indication that demodulation reference signal bundling is enabled for at least one of the first uplink shared channel message or the second uplink shared channel message; and
   performing a cancellation operation based at least in part on the indication that reference signal bundling is enabled, wherein performing the cancellation operation comprises:
      transmitting, to the network device, the first uplink shared channel message using demodulation reference signal bundling; and
      transmitting, to the network device, the second uplink shared channel message using demodulation reference signal bundling after transmission of all of one or more repetitions of the first uplink shared channel message.

2. The method of claim 1, wherein performing the cancellation operation comprises:
   transmitting, to the network device, the first uplink shared channel message using demodulation reference signal bundling; and
   dropping the second uplink shared channel message.

3. The method of claim 1, wherein performing the cancellation operation comprises:
transmitting, to the network device, the second uplink shared channel message using demodulation reference signal bundling; and
dropping the first uplink shared channel message.

4. A method for wireless communications at a user equipment (UE), comprising:
receiving, from a network device, a first control message that schedules a first uplink shared channel message;
receiving, from the network device, a second control message that schedules a second uplink shared channel message for interleaving with the first uplink shared channel message;
receiving an indication that demodulation reference signal bundling is enabled for at least one of the first uplink shared channel message or the second uplink shared channel message; and
performing a cancellation operation based at least in part on the indication that reference signal bundling is enabled, wherein performing the cancellation operation comprises:
disabling demodulation reference signal bundling for the indicated at least one of the first uplink shared channel message or the second uplink shared channel message; and
transmitting the first and second uplink shared channel messages to the network device, the first and second uplink shared channel messages interleaved.

5. A method for wireless communications at a user equipment (UE), comprising:
receiving, from a network device, a first control message that schedules a first uplink shared channel message;
receiving, from the network device, a second control message that schedules a second uplink shared channel message for interleaving with the first uplink shared channel message;
receiving an indication that demodulation reference signal bundling is enabled for at least one of the first uplink shared channel message or the second uplink shared channel message; and
performing a cancellation operation based at least in part on the indication that reference signal bundling is enabled, wherein performing the cancellation operation comprises:
transmitting, to the network device, a message that indicates that the UE is incapable of both interleaving the first and second uplink shared channel messages and enabling demodulation reference signal bundling.

6. A method for wireless communications at a network device, comprising:
transmitting, to a user equipment (UE), a first control message that schedules a first uplink shared channel message;
transmitting, to the UE, a second control message that schedules a second uplink shared channel message for interleaving with the first uplink shared channel message;
transmitting, to the UE, an indication that demodulation reference signal bundling is enabled for at least one of the first uplink shared channel message or the second uplink shared channel message; and
receiving a transmission, from the UE, based at least in part on the indication that reference signal bundling is enabled, wherein receiving a transmission comprises:
receiving, from the UE, the first uplink shared channel message using demodulation reference signal bundling; and
receiving, from the UE, the second uplink shared channel message using demodulation reference signal bundling after transmission of all of one or more repetitions of the first uplink shared channel message.

7. The method of claim 6, wherein receiving a transmission comprises:
receiving, from the UE, the first uplink shared channel message using demodulation reference signal bundling;
receiving, from the UE, an indication that the second uplink shared channel message was dropped.

8. The method of claim 6, wherein receiving a transmission comprises:
receiving, from the UE, the second uplink shared channel message using demodulation reference signal bundling.

9. The method of claim 6, wherein receiving a transmission comprises:
receiving, from the UE, the first and second uplink shared channel messages, the first and second uplink shared channel messages interleaved.

10. A method for wireless communications at a network device, comprising:
transmitting, to a user equipment (UE), a first control message that schedules a first uplink shared channel message;
transmitting, to the UE, a second control message that schedules a second uplink shared channel message for interleaving with the first uplink shared channel message;
transmitting, to the UE, an indication that demodulation reference signal bundling is enabled for at least one of the first uplink shared channel message or the second uplink shared channel message; and
receiving a transmission, from the UE, based at least in part on the indication that reference signal bundling is enabled, wherein receiving a transmission comprises:
receiving, from the UE, a message that indicates that the UE is incapable of both interleaving the first and second uplink shared channel messages and enabling demodulation reference signal bundling.

11. An apparatus for wireless communications at a user equipment (UE), comprising:
one or more memories;
one or more processors coupled with the one or more memories, the one or more memories, individually or collectively, configured to:
receive, from a network device, a first control message that schedules a first uplink shared channel message;
receive, from the network device, a second control message that schedules a second uplink shared channel message for interleaving with the first uplink shared channel message;
receive an indication that demodulation reference signal bundling is enabled for at least one of the first uplink shared channel message or the second uplink shared channel message; and
perform a cancellation operation based at least in part on the indication that reference signal bundling is enabled, wherein to perform the cancellation operation, the one or more processors, individually or collectively, are further configured to:
transmit, to the network device, the first uplink shared channel message using demodulation reference signal bundling; and transmit, to the network device, the second uplink shared channel message using demodulation reference signal bundling after transmission of all of one or more repetitions of the first uplink shared channel message.

12. The apparatus of claim 11, wherein to perform the cancellation operation, the one or more processors, individually or collectively, are further configured to:
  transmit, to the network device, the first uplink shared channel message using demodulation reference signal bundling; and
  drop the second uplink shared channel message.

13. The apparatus of claim 11, wherein to perform the cancellation operation, the one or more processors, individually or collectively, are further configured to:
  transmit, to the network device, the second uplink shared channel message using demodulation reference signal bundling; and
  drop the first uplink shared channel message.

14. An apparatus for wireless communications at a user equipment (UE), comprising:
  one or more memories;
  one or more processors coupled with the one or more memories, the one or more memories, individually or collectively, configured to:
  receive, from a network device, a first control message that schedules a first uplink shared channel message;
  receive, from the network device, a second control message that schedules a second uplink shared channel message for interleaving with the first uplink shared channel message;
  receive an indication that demodulation reference signal bundling is enabled for at least one of the first uplink shared channel message or the second uplink shared channel message; and
  perform a cancellation operation based at least in part on the indication that reference signal bundling is enabled, wherein to perform the cancellation operation, the one or more processors, individually or collectively, are further configured to:
    disable demodulation reference signal bundling for the indicated at least one of the first uplink shared channel message or the second uplink shared channel message; and
    transmit the first and second uplink shared channel messages to the network device, the first and second uplink shared channel messages interleaved.

15. An apparatus for wireless communications at a user equipment (UE), comprising:
  one or more memories;
  one or more processors coupled with the one or more memories, the one or more memories, individually or collectively, configured to:
  receive, from a network device, a first control message that schedules a first uplink shared channel message;
  receive, from the network device, a second control message that schedules a second uplink shared channel message for interleaving with the first uplink shared channel message;
  receive an indication that demodulation reference signal bundling is enabled for at least one of the first uplink shared channel message or the second uplink shared channel message; and
  perform a cancellation operation based at least in part on the indication that reference signal bundling is enabled, wherein to perform the cancellation operation, the one or more processors, individually or collectively, are further configured to:
    transmit, to the network device, a message that indicates that the UE is incapable of both interleaving the first and second uplink shared channel messages and enabling demodulation reference signal bundling.

16. An apparatus for wireless communications at a network device, comprising:
  one or more memories;
  one or more processors coupled with the one or more memories, the one or more memories, individually or collectively, configured to:
  transmit, to a user equipment (UE), a first control message that schedules a first uplink shared channel message;
  transmit, to the UE, a second control message that schedules a second uplink shared channel message for interleaving with the first uplink shared channel message;
  transmit, to the UE, an indication that demodulation reference signal bundling is enabled for at least one of the first uplink shared channel message or the second uplink shared channel message; and
  receive a transmission, from the UE, based at least in part on the indication that reference signal bundling is enabled, wherein to receive a transmission, the one or more processors, individually or collectively, are further configured to:
    receive, from the UE, the first uplink shared channel message using demodulation reference signal bundling; and
    receive, from the UE, the second uplink shared channel message using demodulation reference signal bundling after transmission of all of one or more repetitions of the first uplink shared channel message.

17. The apparatus of claim 16, wherein to receive a transmission, the one or more processors, individually or collectively, are further configured to:
  receive, from the UE, the first uplink shared channel message using demodulation reference signal bundling;
  receive, from the UE, an indication that the second uplink shared channel message was dropped.

18. The apparatus of claim 16, wherein to receive a transmission, the one or more processors, individually or collectively, are further configured to:
  receive, from the UE, the second uplink shared channel message using demodulation reference signal bundling.

19. The apparatus of claim 16, wherein to receive a transmission, the one or more processors, individually or collectively, are further configured to:
  receive, from the UE, the first and second uplink shared channel messages, the first and second uplink shared channel messages interleaved.

20. An apparatus for wireless communications at a network device, comprising:
  one or more memories;
  one or more processors coupled with the one or more memories, the one or more memories, individually or collectively, configured to:
  transmit, to a user equipment (UE), a first control message that schedules a first uplink shared channel message;
  transmit, to the UE, a second control message that schedules a second uplink shared channel message for interleaving with the first uplink shared channel message;
  transmit, to the UE, an indication that demodulation reference signal bundling is enabled for at least one of the first uplink shared channel message or the second uplink shared channel message; and receive a transmission, from the UE, based at least in part on the indication that reference signal bundling is enabled, wherein to receive a transmission, the one or more processors, individually or collectively, are further configured to:

receive, from the UE, a message that indicates that the UE is incapable of both interleaving the first and second uplink shared channel messages and enabling demodulation reference signal bundling.

* * * * *